US010507627B2

(12) United States Patent
Manyapu et al.

(10) Patent No.: US 10,507,627 B2
(45) Date of Patent: Dec. 17, 2019

(54) SYSTEMS AND METHODS FOR FORMING A DUST MITIGATING FABRIC

(71) Applicant: The Boeing Company, Chicago, IL (US)

(72) Inventors: Kavya K. Manyapu, Houston, TX (US); Leora Peltz, Pasadena, CA (US)

(73) Assignee: The Boeing Company, Chicago, IL (US)

( * ) Notice: Subject to any disclaimer, the term of this patent is extended or adjusted under 35 U.S.C. 154(b) by 194 days.

(21) Appl. No.: 15/476,902

(22) Filed: Mar. 31, 2017

(65) Prior Publication Data

US 2018/0281338 A1 Oct. 4, 2018

(51) Int. Cl.
*D03D 1/00* (2006.01)
*D03D 15/00* (2006.01)
(Continued)

(52) U.S. Cl.
CPC ............... *B32B 3/06* (2013.01); *B32B 5/26* (2013.01); *D03D 1/0088* (2013.01); *D03D 15/00* (2013.01); *F16L 59/028* (2013.01); *H02S 20/30* (2014.12); *B32B 2255/02* (2013.01); *B32B 2307/304* (2013.01); *D10B 2401/16* (2013.01)

(58) Field of Classification Search
None
See application file for complete search history.

(56) References Cited

U.S. PATENT DOCUMENTS 5,763,069 A 6/1998 Jordan
8,091,589 B2 1/2012 Yokokawa
(Continued)

FOREIGN PATENT DOCUMENTS

DE 102010008449 8/2011
WO 2016130888 8/2016

OTHER PUBLICATIONS

Manyapu et al, "Investigating the Feasibility of Utilizing Carbon Nanotube Fibers for Spacesuit Dust Mitigation", 46th International Conference on Environmental Systems, Jul. 10-14, 2016, Vienna Austria, pp. 1-14.*
(Continued)

*Primary Examiner* — Jeffry H Aftergut
(74) *Attorney, Agent, or Firm* — McDonnell Boehnen Hulbert & Berghoff LLP

(57) ABSTRACT

In an example, a system for forming a dust-mitigating fabric includes a warp-strand-delivery unit including warp strands. The warp strands include insulative-warp strands and conductive-warp strands. The system includes a plurality of heddles that receive the warp strands, and a plurality of harnesses coupled to the heddles. The dust-mitigating fabric has an adapter for receiving one or more phases of an electrical signal. The warp strands include a group of insulative-warp strands and one or more groups of conductive-warp strands. Each group of conductive-warp strands corresponds to a respective phase of the electrical signal. The harnesses move the groups of warp strands to form a shed, and move, on a group-by-group basis, each group of conductive-warp strands to facilitate forming the adapter. The system further includes a picking device to move a weft strand through the shed to form a fabric.

19 Claims, 27 Drawing Sheets

(51) Int. Cl.
  *B32B 3/06*   (2006.01)
  *B32B 5/26*   (2006.01)
  *H02S 20/30*  (2014.01)
  *F16L 59/02*  (2006.01)

(56) References Cited

U.S. PATENT DOCUMENTS

| | | |
|---|---|---|
| 8,939,179 B2 | 1/2015 | Janicijevic et al. |
| 2007/0089799 A1 | 4/2007 | Zorini |
| 2013/0298399 A1 | 11/2013 | Trigwell et al. |
| 2017/0022638 A1 | 1/2017 | Schnabel et al. |

OTHER PUBLICATIONS

Kawamoto et al "Electrostatic Cleaning System for Removing Lunar Dust Adhering to Space Suits", Journal of Aerospace Engineering, Oct. 2011, pp. 442-444.*

Calle, et al "Dust Particle Removal by Electrostatic and Dielectrophoretic Forces with Applications to NASA Exploration Missions", Proc. ESA Annual Meeting on Electrostatics, 2008, Paper 01, pp. 1-14.*

Co-Pending U.S. Appl. No. 15/199,618, filed Jun. 30, 2016.

Extended European Search Report issued by the European Patent Office for EP Application No. 18165453.8, dated Jun. 13, 2018 (9 pages).

* cited by examiner

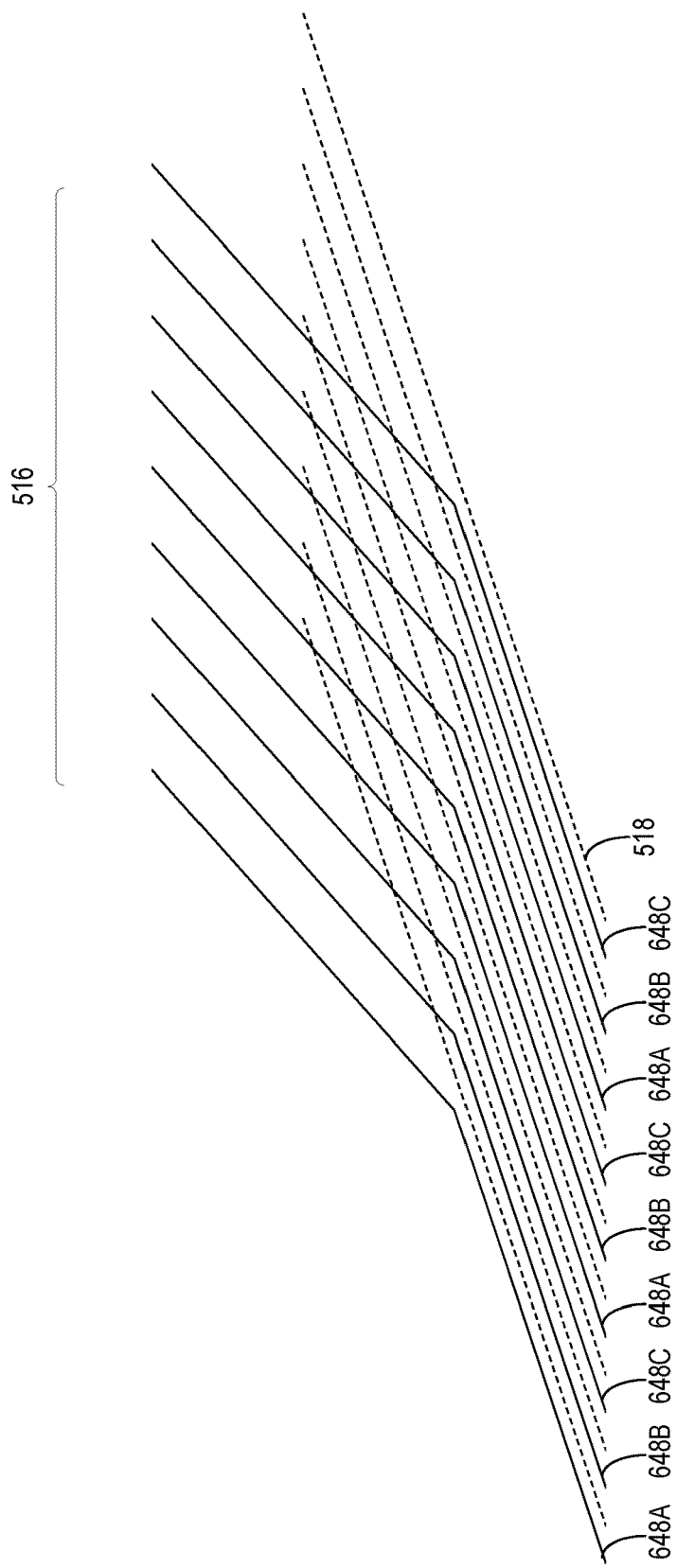

SYSTEMS AND METHODS FOR FORMING A DUST MITIGATING FABRIC

FIELD

The present disclosure generally relates to systems and methods for dust mitigation, and more particularly to systems and methods for forming a dust mitigating fabric.

BACKGROUND

Exploration activities preformed on the Moon by both humans and robotic spacecraft occur on a planetary surface that is comprised of unconsolidated fragmental rock material known as the lunar regolith. The lunar surface is covered by several layers of thick regolith formed by high velocity micrometeoroid impacts, and is characterized by the steady bombardment of charged atomic particles from the sun and the stars. The lunar regolith includes rock fragments and, predominantly, much smaller particles that are generally referred to as lunar soil. From the time of their first interactions with the lunar soil, the NASA Apollo astronauts reported that the lunar soil contained abundant small particles, which have been referred to as "lunar dust" (or just "dust"). This dust caused several anomalies during the Apollo missions because of the lunar dust's strong tendency to collect on, adhere to, or otherwise contaminate the surface of equipment that were utilized in extravehicular activity ("EVA") operations. Today, lunar dust is formally defined as "lunar soil" particles that are smaller than 20 μm in diameter; however for the purposes of this disclosure the term "lunar dust," "lunar soil," or "dust" may be utilized interchangeably.

Additionally, the Apollo mission also exposed the ability of lunar dust to rapidly degrade spacesuits and impact the mission operations. As an example, the Apollo technical crew debriefings and post-mission reports include numerous references by the Apollo crews to the effects of lunar dust on a range of systems and crew activities during lunar surface operations. Among the EVA systems that were mentioned frequently by the crews in relation to possible lunar dust effects were the Apollo spacesuits that were worn during lunar surface operations. These effects included: 1) dust adhering and damaging spacesuit fabrics and system; 2) mechanical problems associated to lunar dust that included problems with fittings and abrasion of suit layers causing suit pressure decay; 3) vision obscuration; 4) false instrument readings due to dust clogging sensor inlets; 5) dust coating and contamination causing thermal control problems; 6) loss of traction; 7) clogging of joint mechanisms; 8) abrasion; 9) seal failures; and 10) inhalation and irritation.

SUMMARY

In an example, a system for forming a dust mitigating fabric is described. The dust mitigating fabric includes an adapter for receiving an electrical signal, having one or more phases, from an alternating-current (AC) power source. The system includes a warp strand delivery unit including a plurality of warp strands. The plurality of warp strands includes a plurality of insulative warp strands and a plurality of conductive warp strands. The plurality of warp strands includes a plurality of groups of warp strands including a group of insulative warp strands and one or more groups of conductive warp strands. Each group of conductive warp strands corresponds to a respective phase of the electrical signal. The system also includes a plurality of heddles that each receive a respective one of the plurality of warp strands and a plurality of harnesses coupled to the plurality of heddles. The plurality of harnesses are operable to: (i) move the plurality of groups of warp strands relative to each other to form a shed between the plurality of insulative warp strands and the plurality of conductive warp strands, and (ii) move, on a group by group basis, each group of conductive warp strands relative to the group of insulative warp strands to facilitate forming the adapter. The system further includes a picking device operable to move a weft strand through the shed to form a woven fabric.

In another example, a method of forming a dust mitigating fabric is described. The dust mitigating fabric includes an adapter for receiving an electrical signal, having one or more phases, from an AC power source. The method includes determining a weave pattern for the dust mitigating fabric and determining, based on the weave pattern, an order and a spacing of a plurality of warp strands. The plurality of warp strands include a plurality of groups of warp strands including a group of insulative warp strands and one or more groups of conductive warp strands. Each group of conductive warp strands corresponds to a respective phase of the electrical signal. The method also includes feeding, based on the order and the spacing, each warp strand through a respective one of a plurality of heddles. The method further includes coupling the plurality of heddles to a plurality of harnesses such that the plurality of groups of warp strands are movable, on a group by group basis, relative to each other, and feeding, from the plurality of heddles, the plurality of warp strands through a reed to a fabric beam.

In another example, a method of forming a dust mitigating fabric includes moving, using a plurality of harnesses, (i) a group of insulative warp strands and (ii) one or more groups of conductive warp strands relative to each other to form a shed. The method also includes moving a weft strand through the shed to form a woven fabric and, after forming the woven fabric, forming an adapter for coupling each group of conductive warp strands to a respective phase of an electrical signal of an AC power source. Forming the adapter includes, for each group of conductive warp strands: (i) raising, using the plurality of harnesses, the group of conductive warp strands relative to the group of insulative warp strands, (ii) while the group of conductive warp strands is raised, inserting an insulating termination sheet between the group of conductive warp strands and the group of insulative warp strands, (iii) after inserting the insulating termination sheet, lowering, using the plurality of harnesses, the group of conductive warp strands onto the insulating termination sheet, and (iv) after lowering the group of conductive warp strands, coupling a conducting termination sheet to the insulating termination sheet such that the group of conductive warp strands is between the insulating termination sheet and the conducting termination sheet.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

FIGS. 8A-8J illustrate a process for forming an adapter of a dust mitigating fabric according to an example embodiment.

DETAILED DESCRIPTION

Figure 1:
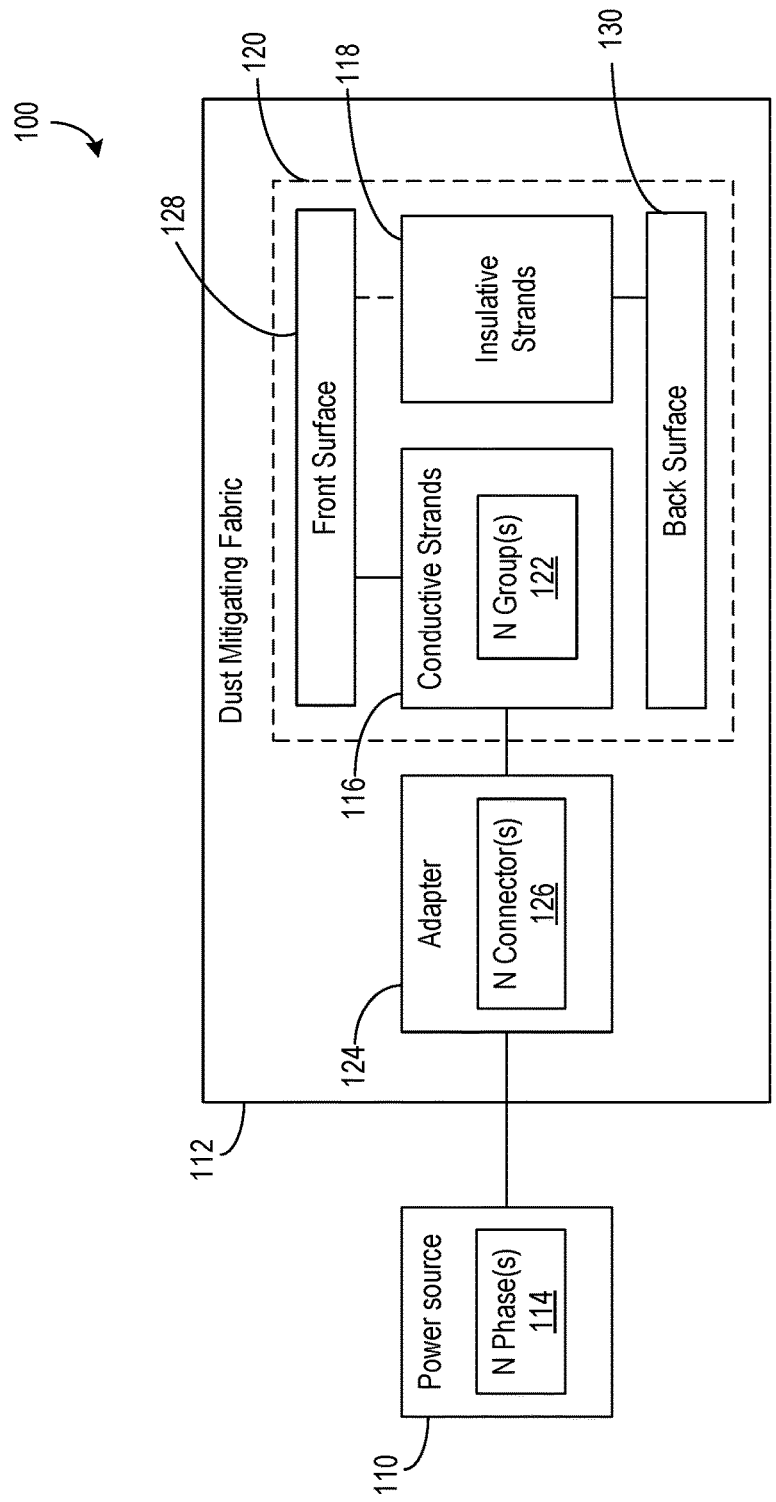
FIG. 1 illustrates a simplified block diagram of a dust mitigating system according to an example embodiment.

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

The systems and methods of the present disclosure provide manufacturing systems and methods for forming a dust mitigating fabric. In general, the dust mitigating fabric includes a plurality of insulative strands and a plurality of conductive strands at defined spacing intervals. In this arrangement, a power source can apply an electrical signal to the conductive strands to repel dust. Within examples, the dust mitigating fabric can be used for a spacesuit, a space habitat, an inflatable structure, a flexible antenna, a flexible solar panel, and/or other flexible structures to repel dust both for terrestrial and space environments. Also, within examples, the systems and methods of the present application can enhance and/or optimize the compatibility of the dust mitigation fabric with various environments (e.g., earth, space, large and small dust particles). Additional details regarding the structure and operation of example dust mitigating fabrics that can be formed by the systems and methods of the present disclosure are disclosed in co-pending U.S. application Ser. No. 15/199,618, filed Jun. 30, 2016, the contents of which is hereby incorporated by reference in its entirety.

In some instances, existing processes for fabricating the dust mitigating fabric can be a labor- and time-intensive. For example, it can be challenging to manually strand each conductive strand into a fabric and then couple all of the conductive strands to the power source. Indeed, some dust mitigating fabrics may have hundreds or thousands of conductive strands. As such, some existing fabrication processes may not be commercially feasible for some large scale dust mitigating fabrics. Additionally, for example, manually fabricating some dust mitigating fabrics may cause the conductive strands and/or the insulative strands to be misaligned and/or inaccurately spaced, which may negatively affect the dust mitigation performance of the dust mitigating fabrics. Further still, in some instances, manual fabrication techniques may limit the types of conductor patterns in the dust mitigating fabric, and/or cause local degradation of the dust mitigating fabric.

Within examples, the present disclosure provides for systems and methods that can beneficially address one or more of the above challenges associated with existing processes for fabricating the dust mitigating fabrics. For instance, within examples, the systems and methods of the present disclosure provide for forming a dust mitigating fabric autonomously and/or semi-autonomously by moving the conductive strands in one or more groups to facilitate forming an integrated adapter for coupling each group to a respective phase of an electrical signal to be provided by the power source. The adapter can advantageously separate the conductive strands of the groups from each other to mitigate short circuit conditions between groups.

Additionally, for example, the systems and methods of the present disclosure can advantageously provide for forming the dust mitigating fabric with a conductive strand weave pattern based on one or more factors relating to desired performance characteristics of the dust mitigating fabric. As such, the systems and methods can be dynamically configured to form a variety of dust mitigating fabrics for use in different environments. Further, for example, the systems and methods of the present disclosure provide for forming dust mitigating fabrics with precise and stable alignments between the conductive strands and/or insulative strands.

These and other advantages of the systems and methods of the present disclosure will now be described with reference to the Figures.

Referring now to FIG. 1, a simplified block diagram of a dust mitigating system 100 is depicted according to an example. As shown in FIG. 1, the dust mitigating system 100 includes a power source 110 and a dust mitigating fabric 112. The power source 110 can be an alternating-current (AC) power source that provides an electrical signal having one or more phases. As such, in FIG. 1, the power source 110 is depicted as providing an electrical signal having N phases 114, where N is integer value greater than or equal to one. In one example, the power source 110 can provide a single phase electrical signal (i.e., N=1). In another example, the power source 110 can provide a three-phase electrical signal (i.e., N=3).

The dust mitigating fabric 112 includes a plurality of conductive strands 116 and a plurality of insulative strands 118 that form a woven fabric 120. As shown in FIG. 1, the conductive strands 116 can include N group(s) 122 of conductive strands 116, and each group of conductive strands 116 can correspond to a respective one of the phases 114 of the electrical signal. The dust mitigating fabric 112 also includes an adapter 124 having N connector(s) 126 for coupling each group 122 of conductive strands 116 to the respective phase 114 of the electrical signal.

Responsive to the conductive strands 116 receiving the electrical signal from the power source 110 via the adapter 124, the conductive strands 116 generate an electric-field on a front surface 128 of the woven fabric 120. In an example, the electric-field can be a traveling wave that traverses along the front surface 128 of the woven fabric 120 to repel dust from the front surface 128. Within examples, the conductive strands 116 can be exposed on the front surface 128 and/or covered by a layer of material having a relative low dielectric constant and/or high dielectric strength so long as the electric-field generated by the conductive strands 116 can repel dust on the front surface 128.

The insulative strands 118 can be provided on a back surface 130 of the woven fabric 120. In this way, the back surface 130 can be configured to face a user (e.g., a wearer) of the woven fabric 120 so that insulative strands 118 protect the user from the electric-field generated by the conductive strands 116 on the front surface 128. In some implementations, the insulative strands 118 can optionally be provided on the front surface 128 along with the conductive strands 116.

Additional details regarding the structure and operation of the example dust mitigating system 100 are disclosed in co-pending U.S. application Ser. No. 15/199,618, filed Jun. 30, 2016, the contents of which is hereby incorporated by reference in its entirety.

Figure 2:
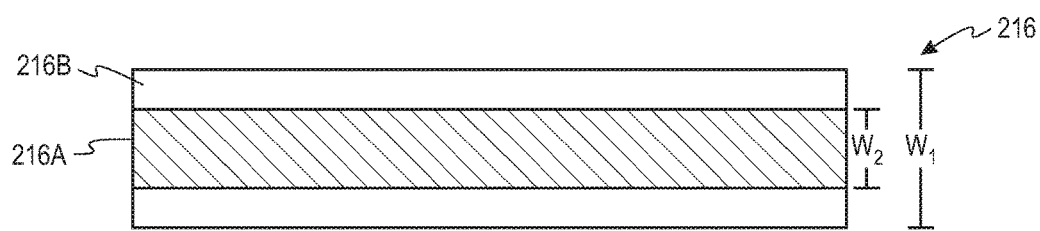
FIG. 2 illustrates a conductive strand according to an example embodiment.
Figure 3:
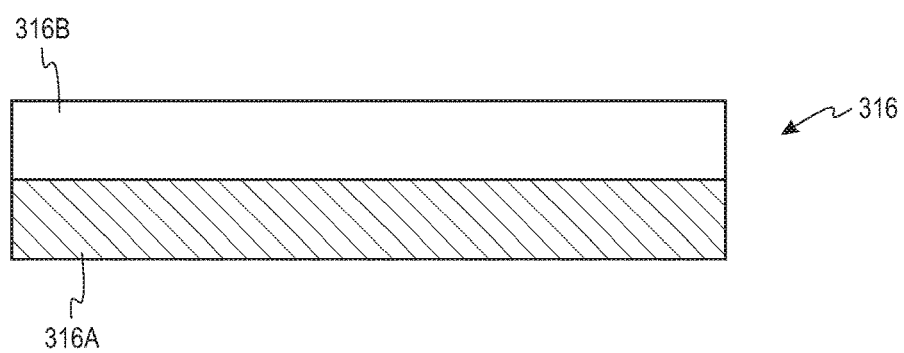
FIG. 3 illustrates a conductive strand according to an example embodiment.
Figure 4:
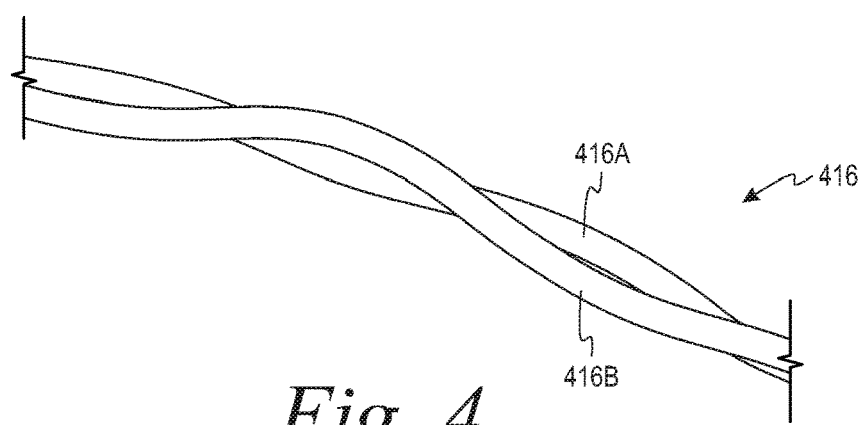
FIG. 4 illustrates a conductive strand according to an example embodiment.

FIGS. 2-4 depict example configurations for the conductive strand 116 according example embodiments. FIG. 2 depicts a top view of a conductive strand 216 including a conductive tow 216A on an insulative tow 216B (i.e., in a stacked arrangement). In this arrangement, the insulative tow 216B can provide a bottom surface of the conductive strand 216 and the conductive tow 216A can provide a top surface of the conductive strand 216. As such, the conductive tow 216A can be provided facing the front surface 128 of the woven fabric 120 to facilitate applying the electrical-field to dust on the front surface 128 of woven fabric 120.

Additionally, with the insulative tow 216B facing the back surface 130 of the woven fabric 120, the insulative tow 216B can help to protect the user of the woven fabric 120 from the electrical signals on the conductive tow 216A. The insulative tow 216B can also insulate the conductive tow 216A from adjacent conductive strands below the conductive strand 216 in the woven fabric 120. As shown in FIG. 2, the insulative tow 216B has a width W1 that is greater than a width W2 of the conductive tow 216A. This can further facilitate insulating the conductive tow 216A from other conductive strands 216 and/or the user of the woven fabric 120.

In some examples, the conductive tow 216A can be coupled to the insulative tow 216B such as, for instance, by an adhesive. This can facilitate maintaining the conductive tow 216A on the insulative tow 216B with the conductive tow 216A facing the front surface 128 and the insulative tow 216B facing the back surface 130 of the woven fabric 120. In other examples, the conductive tow 216A may not be coupled to the insulative tow 216B. For instance, the relative positions of the conductive tow 216A and the insulative tow 216B can be maintained by applying tension to the conductive strand 216 during a process for forming the woven fabric 120, as described in further detail below.

FIG. 3 depicts a top view of a conductive strand 316 according to another example. The conductive strand 316 includes a conductive tow 316A and an insulative tow 316B in a side-by-side arrangement. In this arrangement, the insulative tow 316B does not insulate the conductive tow 316A from other conductive strands below and/or the user of the woven fabric 120. As such, the conductive strand 316 can be used in woven fabrics 120 in which there may not be other conductive strands below and/or there is another insulator material between the conductive strand 316 and the user of the woven fabric 120.

FIG. 4 depicts a conductive strand 416 according to still another example. The conductive strand 416 includes a conductive strand 416A and an insulative strand 416B in a twisted configuration. In this arrangement, the insulative strand 416B does not insulate the conductive strand 416A from other conductive strands below and/or the user of the woven fabric 120. As such, the conductive strand 416 can be used in woven fabrics 120 in which there may not be other conductive strands below and/or there is another insulator material between the conductive strand 416 and the user of the woven fabric 120.

As examples, the conductive tow 216A can include a carbon nanotube (CNT) material (e.g., CNT flexible fibers), a carbon fiber, a graphite fiber, a metallic thread, a metallic foil, a metal coated plastic (e.g., mylar), an organic conductive polymer, a graphene doped polymer, other conductive materials, and/or combinations thereof. Additionally, as examples, the insulative tow 216B can include a plastic (e.g., polyethylene fiber), an insulative composite polymer fiber, a glass fiber, Teflon, a polyimide material, a polyurethane coated nylon fiber, other insulative materials, and/or combinations thereof. Although the example conductive strands 216, 316, 416 depicted in FIGS. 2-4 are two-ply conductive strands having a conductive tow/strand and an insulative tow/strand, the conductive strands 116 can be multi-ply conductive strands each having more than two tows and/or strands in additional or alternative examples.

FIGS. 5A-5D depict a portion of the dust mitigating fabric 112 having woven fabrics 120A-120D with various weave patterns according to example embodiments. As shown in FIGS. 5A-5D, the woven fabrics 120A-120D each include a plurality of warp strands 534 and one or more weft strands 536. The warp strands 534 include a plurality of conductive warp strands 516 and a plurality of insulative warp strands 518. The warp strands 534 can be arranged in an order in which the conductive warp strands 516 and the insulative warp strands 518 alternate every warp strand 534. Additionally, the warp strands 534 are arranged with a spacing that is based, at least in part, on a thickness of the warp strands 534. The weft strand(s) 536 include an insulative weft strand 518' in FIGS. 5A-5B, whereas the weft strand(s) 536 include a conductive weft strand 516' in FIGS. 5C-5D.

In FIGS. 5A-5D, the conductive warp strands 516 and the conductive weft strand 516' are in the form of the two-ply conductive strand 216 depicted and described above with respect to FIG. 2. As such, the conductive warp strands 516 and the conductive weft strand 516' each include a conductive tow 216A on an insulative tow 216B. As shown in FIGS. 5A-5D, the warp strands 534 are woven with the weft strand 536 such that the conductive tows 216A face the front surface 128 of the woven fabric 120A-120D and the insulative tows 216B face the back surface 130 of the woven fabric 120A-120D. As noted above, this can help to protect a user from the electric-field generated on the conductive tows 216A.

Figure 5A:
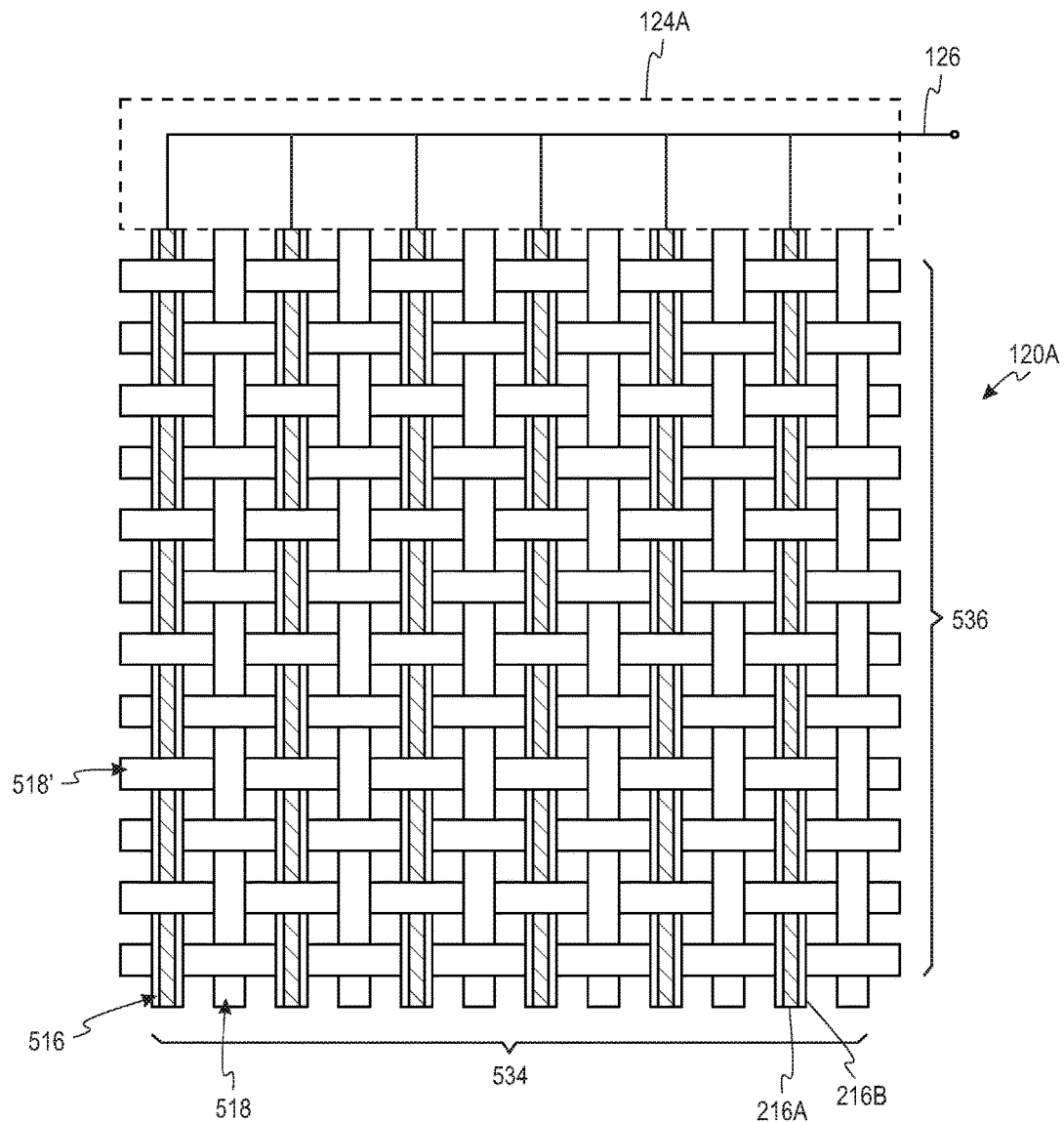
FIG. 5A illustrates a dust mitigating fabric according to an example embodiment.
Figure 5B:
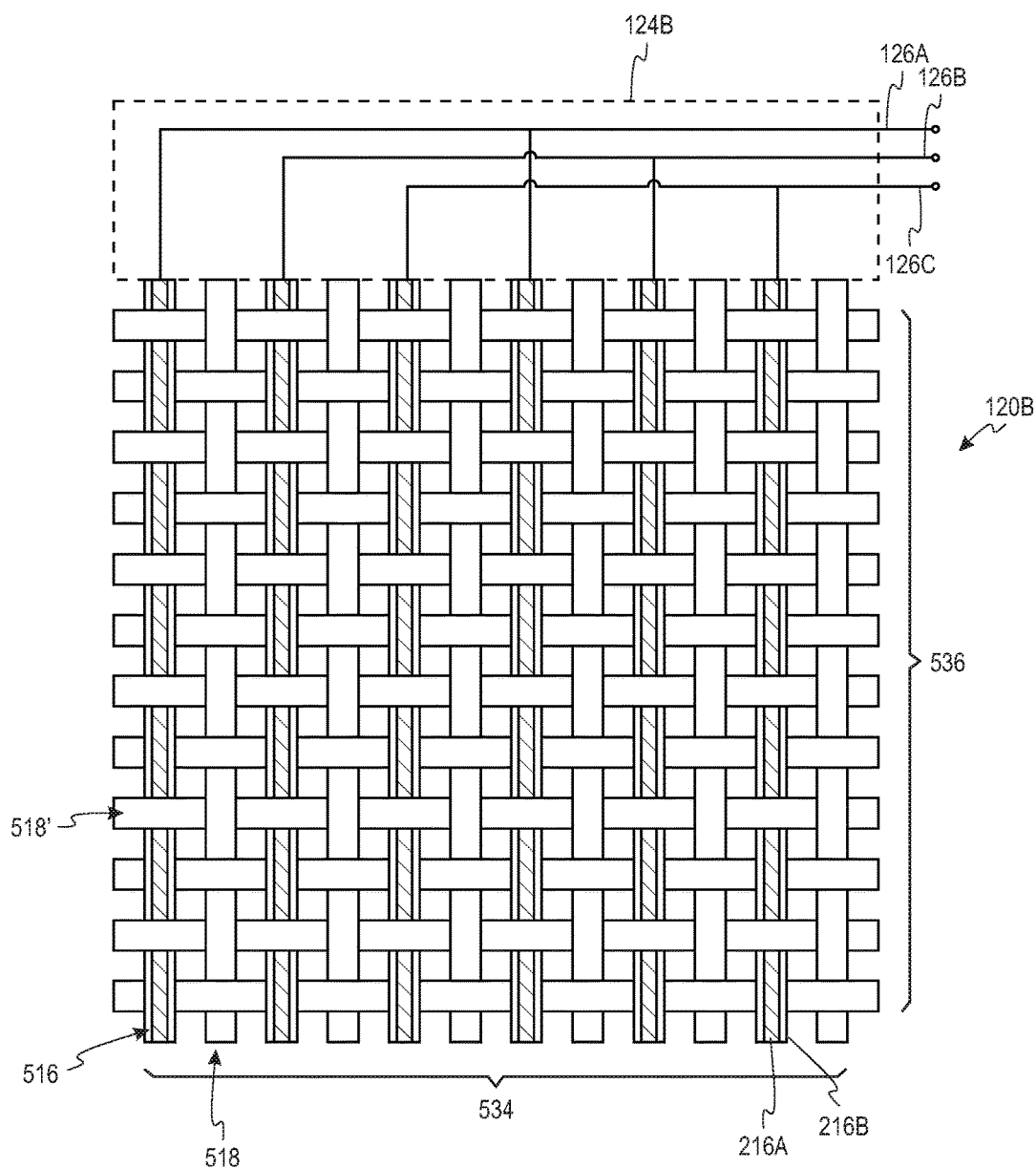
FIG. 5B illustrates a dust mitigating fabric according to an example embodiment.
Figure 5C:
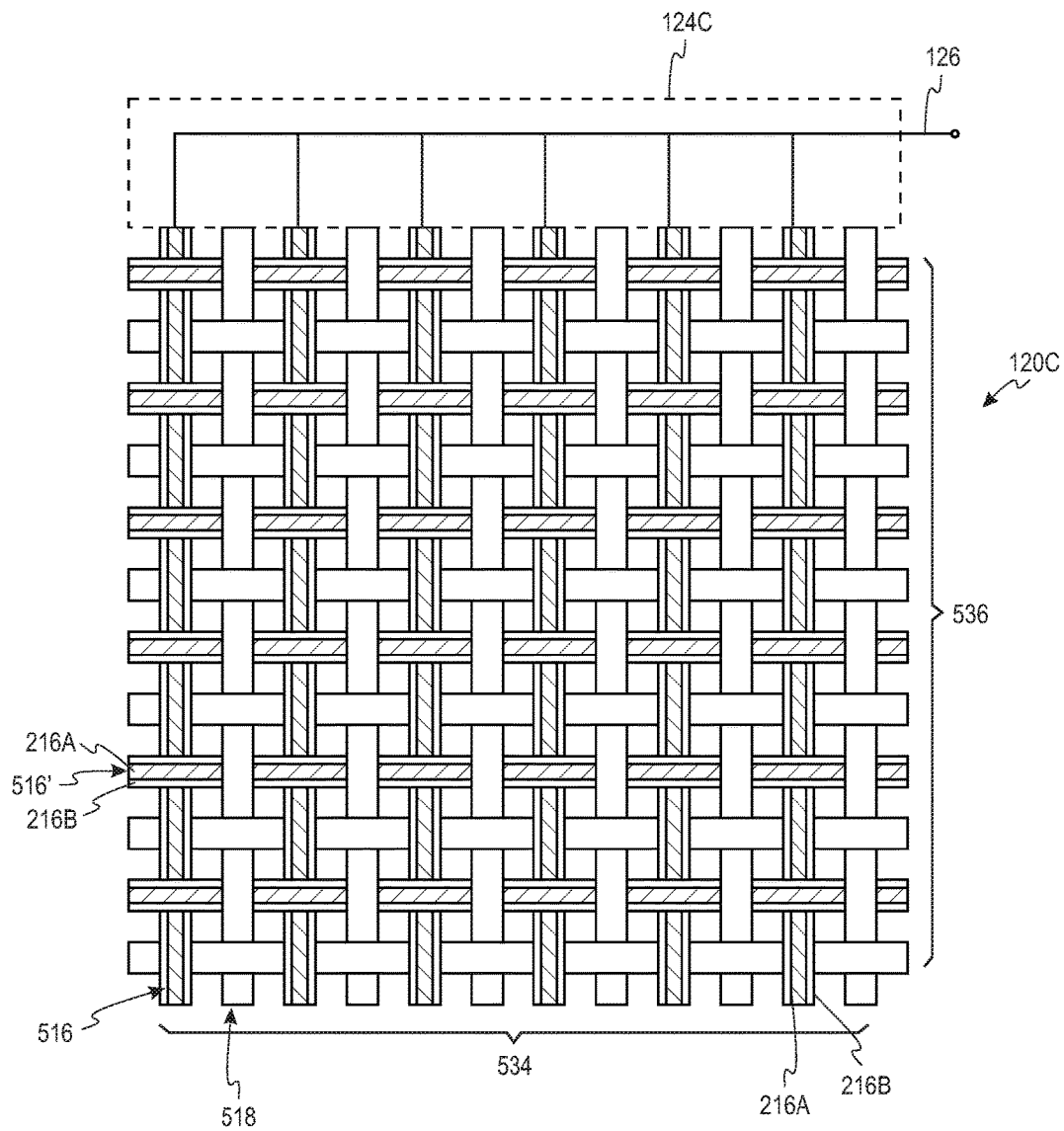
FIG. 5C illustrates a dust mitigating fabric according to an example embodiment.
Figure 5D:
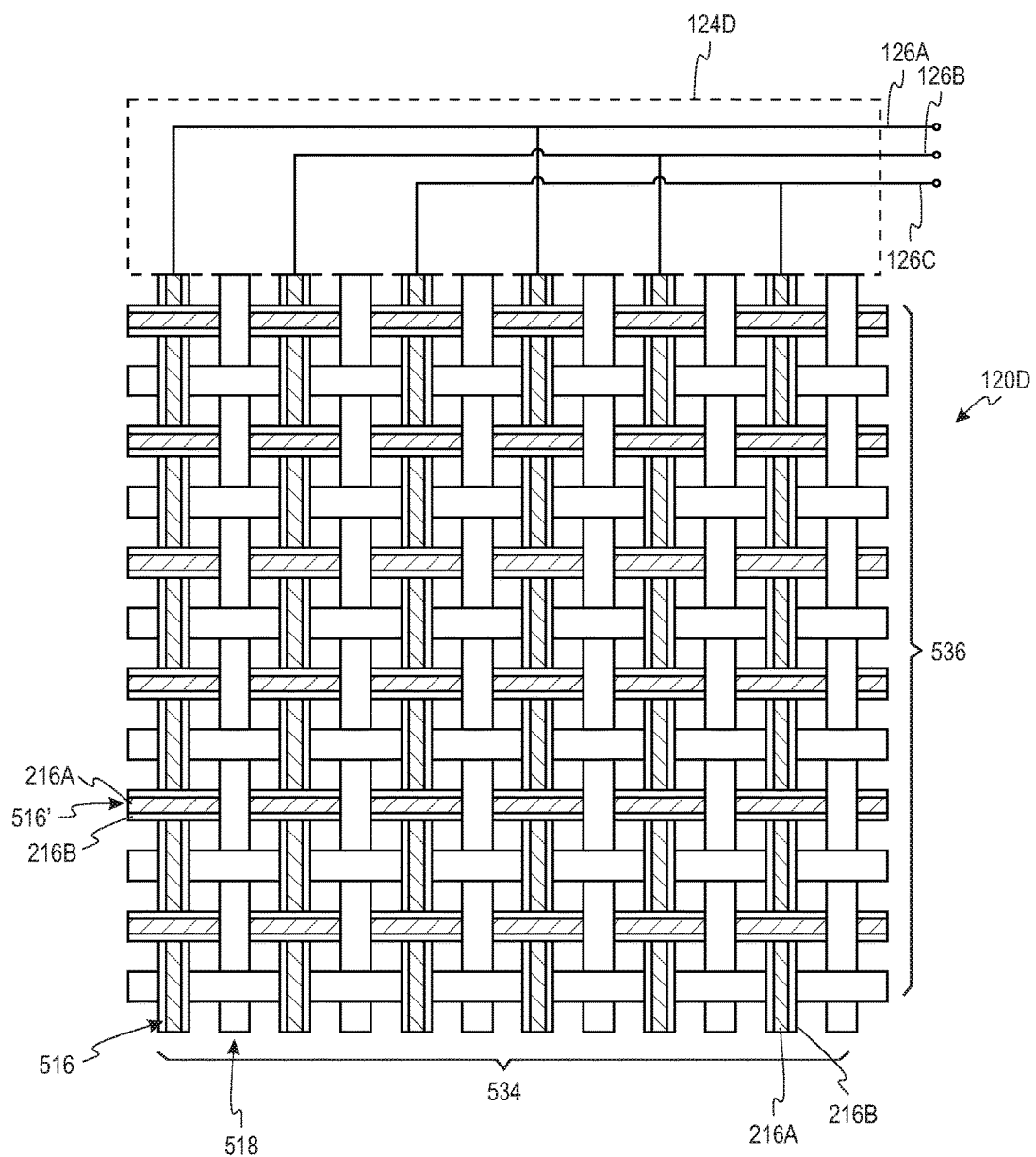
FIG. 5D illustrates a dust mitigating fabric according to an example embodiment.

Additionally, as shown in FIGS. 5C-5D, the insulative tows 216B are between the conductive tows 216A at each intersection between the conductive warp strands 516 and the conductive weft strand(s) 516'. That is, for each conductive warp strand 516 in the woven fabric 120A-120D, the weft strand 516' is separated from the conductive tow 216A by the insulative tow 216B. This can help to mitigate (or prevent) shorting of the electrical signal conducted along the conductive warp strands 516 and/or the conductive weft strand(s) 516'.

As further shown in FIGS. 5A-5D, an adapter 124A-124D is coupled to the conductive warp strands 516 to facilitate coupling the conductive warp strands 516 to the power source 110. In FIG. 5A and FIG. 5C, the adapter 124A, 124C is configured to couple the conductive warp strands 516 to the power source 110 providing the electrical signal with a single phase. As such, the adapter 124A, 124C has a single connector 126 for coupling the conductive warp strands 516 to the power source 110. In FIG. 5A and FIG. 5C, the conductive warp strands 516 are thus provided as a single group (i.e., N=1), which is coupled to the power source 110 via the adapter 124A, 124C.

In FIG. 5B and FIG. 5D, the adapter 124B, 124D is configured to couple the conductive warp strands 516 to the power source 110 providing the electrical signal with three phases. As such, the adapter 124B, 124D has a first connector 126A coupled to a first group of the conductive warp strands 516, a second connector 126B coupled to a second group of the conductive warp strands 516, and a third connector 126C coupled to a third group of the conductive warp strands 516. Additionally, the first connector 126A can be coupled to the power source 110 to receive a first phase of the electrical signal, the second connector 126B can be coupled to the power source 110 to receive a second phase of the electrical signal, and the third connector 126C can be coupled to the power source 110 to receive a third phase of the electrical signal.

As described in detail below, the adapter 124B, 124D can include an insulating material between the phases of the electrical signal provided from the connectors 126A, 126B, 126C to the respective groups of conductive warp threads 516 to prevent a short-circuit condition between the phases of the electrical signal. Additionally, although not shown in FIG. 5C and FIG. 5D, the adapter 124C and the adapter 124D can include one or more connectors coupled to the conductive weft strands 516' and configured to receive one or more phases of the electrical signal.

Figure 6:
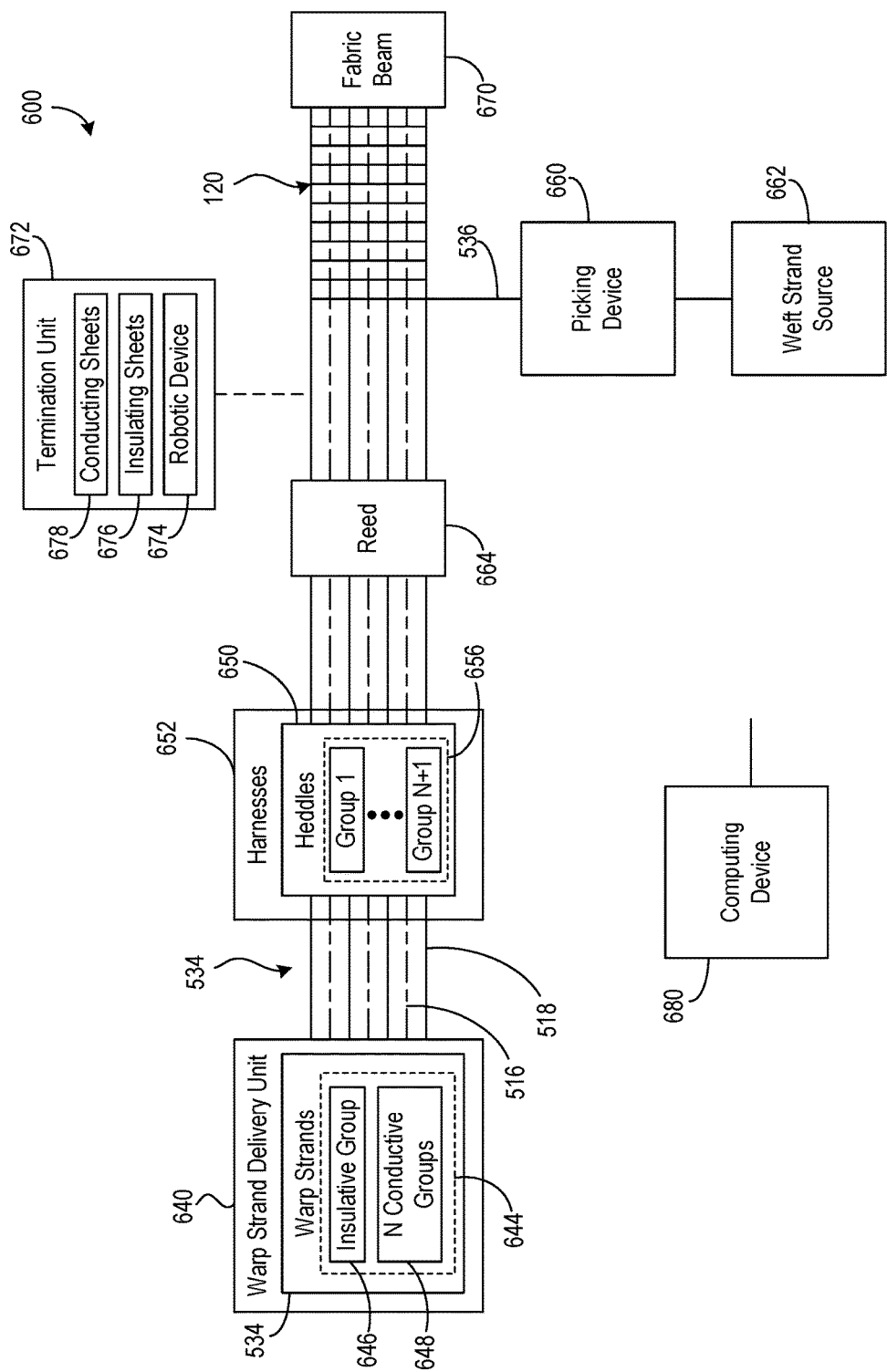
FIG. 6 illustrates a simplified block diagram of a system for forming a dust mitigating fabric according to an example embodiment.
Figure 7:
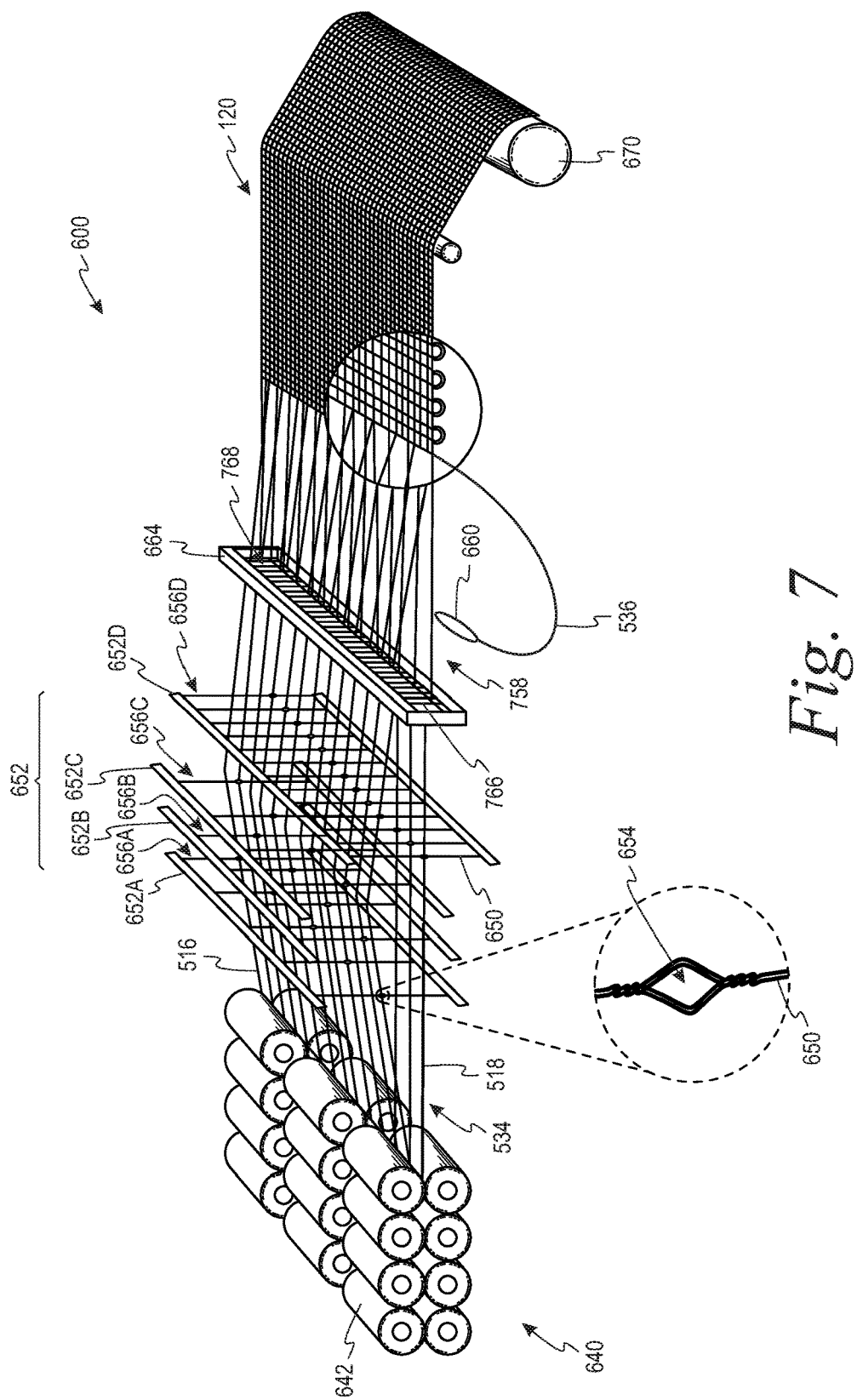
FIG. 7 illustrates components of the system for forming a dust mitigating fabric according to an example implementation of system of FIG. 6.

Referring now to FIGS. 6-7, a system 600 for forming the dust mitigating fabric 112 is depicted according to an example embodiment. In particular, FIG. 6 depicts a simplified block diagram of the system 600 according to the example embodiment and FIG. 7 depicts a perspective view of select components of the system 600 according to an example implementation.

As shown in FIGS. 6-7, the system 600 is in the form of a loom that is operable to weave the weft strand(s) 536 with the plurality of warp strands 534 to form the woven fabric 120. Within examples, the warp strands 534 include the plurality of conductive warp strands 516 and the plurality of insulative warp strands 518. The weft strand(s) 536 can include a conductive weft strand 516' and/or an insulative weft strand 518'. The system 600 is further operable to facilitate terminating the conductive warp strands 516 to provide the dust mitigating fabric 112 with the integrated adapter 124 for coupling the conductive warp strands 516 with the AC power source. Within examples, the system 600 can be configured to operate autonomously and/or semi-autonomously.

As shown in FIGS. 6-7, the system 600 has a warp strand delivery unit 640 including the plurality of warp strands 534. In general, the warp strand delivery unit 640 is operable to supply the warp strands 534 in the system 600. In FIG. 7, for example, the warp strand delivery unit 640 is a creel having a plurality of bobbins 642 and each bobbin 642 includes a respective one of the warp strands 534. As examples, the creel can be a V-type creel, a rectangular creel, a truck creel, a continuous chain creel, a magazine creel, and/or an automatic creel. In another example, the warp strand delivery unit 640 can additionally or alternatively include a warp beam (not shown). The warp bream can be in the form of a roller on which the warp strands 534 are wound in parallel to each other.

As described above, the plurality of warp strands 534 include a plurality of groups 644 of warp strands 534. As shown in FIG. 6, the groups 644 of warp strands 534 include a group 646 of insulative warp strands 518 and one or more groups 648 of conductive warp strands 516 (i.e., N groups 648 of conductive warp strands 516). Each group 644 of conductive warp strands 516 corresponds to a respective phase of the electrical signal to be received from the power source 110.

The system 600 also includes a plurality of heddles 650 coupled to a plurality of harnesses 652. As examples, the heddles 650 can be strand heddles, inserted-eye heddles, flat steel heddles, and/or string heddles. The heddles 650 each receive a respective one of the warp strands 534. For example, as shown in FIG. 7, each heddle 650 can include an aperture 654 (e.g., an eyelet) that receives and guides a respective one of the warp strands 534 fed from the warp strand delivery unit 640 through the aperture 654. Each aperture 654 can be sized and/or the shaped to facilitate smoothly feeding the respective warp strand 534 through the aperture 654 without catching or fraying the warp strand 534.

In an example, the heddles 650 can additionally orient the conductive warp strands 516 such that each conductive tow 216A is on the front surface 128 of the woven fabric 120 and each insulative tow 216B is on the back surface 130 of the woven fabric 120 opposing the front surface 128 of the woven fabric 120. For instance, as shown in FIG. 7, the aperture 654 can have a size and/or a shape corresponding to a shape and/or size of the respective conductive strand 516 such that the aperture 654 inhibits (or prevents) the conductive warp strand 516 from rotating within the aperture 654.

By receiving the warp strands 534 in the apertures 654, the heddles 650 can control the respective positions of the warp strands 534 relative to each other. As such, the heddles 650 can position the warp strands 534 with a predetermined spacing and/or in a predetermined order relative to each other. The predetermined spacing and/or the predetermined order can be based on the particular weave pattern that is desired for the woven fabric 120 (e.g., the weave patterns shown in FIGS. 5A-5D). In some examples, the warp strands 534 can be fed through the heddles 650 such that the conductive warp strands 516 and the insulative warp strands 518 alternate every M strands, where M is an integer value equal to or greater than one (e.g., an integer value of 1, 2, 3, 4, 5, etc.).

Additionally, as shown in FIG. 6, the heddles 650 can be arranged in a plurality of groups 656. For instance, each group 656 of heddles 650 can receive a respective one of the groups 644 of warp strands 534. As there are N groups 648 of conductive warp strands 516 and a group 646 of insulative warp strands 518, the system 600 can include N+1 groups 656 of heddles 650.

In one example, each group 656 of heddles 650 is coupled to a respective one of the harnesses 652. In this arrangement, moving one of the harnesses 652 responsively moves the group 656 of heddles 650 coupled to the harness 652 and, thus, the group 644 of warp strands 534 received by the group 656 of heddles 650. For instance, as described further below, the harnesses 652 are operable to: (i) move the groups 644 of warp strands 534 relative to each other to form a shed 758 between the plurality of insulative warp strands 518 and the plurality of conductive warp strands 516, and (ii) move, on a group by group basis, each group 548 of conductive warp strands 516 relative to the group 646 of insulative warp strands 518 to facilitate forming the adapter 124.

In FIG. 7, for example, the harnesses 652 include a first harness 652A coupled to a first group 656A of heddles 650 receiving a first group of conductive warp strands 516, a second harness 652B coupled to a second group 656B of heddles 650 receiving a second group 648B of conductive warp strands 516, a third harness 652C coupled to a third group 656C of heddles 650 receiving a third group of conductive warp strands 516, and a fourth harness 652D coupled to a fourth group 656D of heddles 650 receiving the group 646 of insulative warp strands 518. The first harness 652A, the second harness 652B, the third harness 652C, and the fourth harness 652D are each individually and independently movable (e.g., by one or more actuators), on a group by group basis, between a lowered position and an elevated position to move the respective groups 656A-656D of heddles 650 and the respective groups 644 of warp strands 534 relative to each other.

As shown in FIG. 7, the first harness 652A, the second harness 652B, and the third harness 652C are in the elevated position and the fourth harness 652D is in the lowered position. As such, the conductive warp strands 516 are raised in the elevated position relative to the insulative warp strands 518 to form the shed 758. Similarly, the shed 758 can also be formed by raising the fourth harness 652D to the elevated position and lowering the first harness 652A, the second harness 652B, and the third harness 652C to the lowered position so that the insulative warp strands 518 are raised relative to the conductive warp strands 516. More generally, the harnesses 652 are operable to move (i) the group 646 insulative warp strands 518 and (ii) all of the groups 648 of conductive warp strands 516 relative to each other (e.g., between the elevated position and the lowered position) to form the shed 758 between the conductive warp strands 516 and the insulative warp strands 518.

As described above, in FIG. 7, the system 600 includes four harnesses coupled to the group 646 of insulative warp strands 518 and three groups 648 of conductive warp strands 516. In an implementation, the first group of conductive warp strands 516 corresponds to a first phase of the electrical signal, the second group of conductive warp strands 516 corresponds to a second phase of the electrical signal, and the third group of conductive warp strands 516 corresponds to a third phase of the electrical signal. As described in detail below, the harnesses 652 are operable to move, on a group by group basis, the groups 648 of conductive warp strands 516 relative to each other to facilitate terminating the different groups 648 of conductive warp strands 516 by phase while forming the adapter 124. For example, in FIG. 7, the first harness 652A is operable to move relative to the second harness 652B and the third harness 652C, the second harness 652B is operable to move relative to the first harness 652A and the third harness 652C, and the third harness 652C is operable to move relative to the first harness 652A and the second harness 652C between the elevated position and the lowered position.

Although the system 600 depicted in FIG. 7 includes three groups 648 of conductive warp strands 516, the system 600 can include a greater or a lesser quantity of groups 648 in additional or alternative examples (e.g., as shown in FIG. 6). In one alternative example, the groups 648 of conductive warp strands 516 can include a single group 648 of conductive warp strands 516 and the power source 110 can provide the electrical signal with a single phase to the conductive warp strands 516. In an implementation of this alternative example, the system 600 can include a first harness 652 coupled to the group 656 of heddles 650 receiving the group 648 of conductive warp strands 516 and a second harness 652 coupled to the group 656 of heddles 650 receiving the group 646 of insulative warp strands 518.

Additionally, although FIG. 7 depicts an example in which the heddles 650 of each group 656 are coupled to only one of the harnesses 652, a group 656 of heddles 650 can be distributed over multiple harnesses 652 in an additional or alternative example. For instance, in some implementations, one or more of the groups of heddles 650 can include a plurality of sub-groups of heddles 650 and each sub-group can be coupled to a different one of the harness 652. This can provide greater flexibility in moving the warp strands 534 relative to each other, which can allow the system 600 to form the woven fabric 120 with a wider variety of weave patterns.

As noted above, the harnesses 652 can raise and lower the groups 656 of heddles 650 to form the shed 758 between the warp strands 534. As shown in FIGS. 6-7, the system 600 includes a picking device 660 that is operable to move the weft strand(s) 536 through the shed 758 to form the woven fabric 120. As examples, the picking device 660 can include a shuttle, a rapier, an air-jet, and/or a projectile picking device.

The picking device 660 can receive the weft strand(s) 536 from a weft strand source 662. In one example, the weft strand source 662 can include a bobbin 642 on the creel of the warp strand delivery unit 640. In another example, the weft strand source 662 can be separate from the warp strand delivery unit 640. More generally, the picking device 660 receives the weft strand(s) 536 from the weft strand source 662 and moves the weft strand(s) 536 through the shed 758 to form the woven fabric 120.

The system 600 also includes a reed 664 that can batten and compact the weft strand 536, which is inserted by the picking device 660 in the shed 758, up against the woven fabric 120. In an example, the reed 664 can include a plurality of partitions 766 forming gaps, which may be referred to as dents 768. Each dent 768 can receive one or more of the warp strands 534 to help maintain the predetermined order and/or spacing of the warp strands 534 relative to each other. The reed 664 can also guide the picking device 660 as it moves through the shed 758 and across the warp strands 534. A fabric beam 670 receives the woven fabric 120 formed by the warp strands 534 and the weft strand(s) 536.

As shown in FIG. 6, the system 600 also includes a termination unit 672. The termination unit 672 can facilitate terminating the conductive warp strands 516 to form the adapter 124 for coupling the conductive warp strands 516 to the power source 110. In one example, the termination unit 672 can include a robot device 674 having an end effector that can pick and place one or more insulating termination sheets 676 and/or one or more conducting termination sheets 678 at predetermined positions on the warp strands 534 to terminate the conductive warp strands 516. For instance, the robotic device 674 can be a movable robotic arm having a gripper that can open and close to facilitate picking and placing the insulating termination sheet(s) 676 and/or the conducting termination sheet(s) 678 on the warp strands 534 to form the adapter 124 having the connector(s) 126 for coupling the conductive warp strands 516 to the power source 110. In additional or alternative examples, the robotic device 674 can be omitted. In such examples, the picking and placing of the insulating termination sheet(s) 676 and/or the conducting termination sheet(s) 678 can be performed manually.

The insulating termination sheet(s) 676 can be made of an insulating material such as, for example, a thermoplastic, a polyimide (e.g., Kapton), Teflon, fiberglass. Additionally, the conducting termination sheet(s) 678 can be made of a conducting material such as, for example, a metallic foil, a metallic plate, a metallic tape (e.g., a copper tape), a graphite sheet (e.g., a flexible graphite sheet), a carbon fiber sheet (e.g., a woven carbon fabric). In some implementations, the insulating termination sheet(s) 676 can be coupled to the conducting termination sheet(s) 678 by an adhesive on at least one of the insulating termination sheet(s) 676 or the conducting termination sheet(s) 678.

The system 600 can further include a computing device 680 for controlling operation of the system 600. The computing device 680 can be implemented using hardware, software, and/or firmware. For example, the computing device 680 can include one or more processors and a non-transitory computer readable medium (e.g., volatile and/or non-volatile memory) that stores machine language instructions or other executable instructions. The instructions, when executed by the one or more processors, cause the system 600 to carry out the various operations described herein.

In operation, a process for forming the dust mitigating fabric 112 using the system 600 can include first determining a weave pattern for the dust mitigating fabric 112, and then configuring the system 600 based on the determined weave pattern. The determined weave pattern can be characterized by one or more parameters such as, for example, (a) an order of the conductive warp strands 516 and the insulative warp strands 518, (b) a spacing of the warp strands 534 relative to one another, (c) a spacing of the weft strands 536 relative to one another, (d) a material for the conductive warp strands 516 and/or conductive weft strands 516', (e) a material for the insulative warp strands 518 and/or insulative weft strands 518', (f) a thickness of the warp strands 534 and/or weft strands 536, (g) a configuration of the conductive warp strands 516 (e.g., two-ply in a stacked configuration as shown in FIG. 2, a side-by-side configuration as shown in FIG. 3, and/or a twisted-strand configuration as shown in FIG. 4), (h) an orientation of the warp strands 534 and/or weft strands 536, and/or (i) whether the weft strand 536 is a conductive weft strand 516' and/or an insulative weft strand 518'.

In one example, the weave pattern can be determined based on at least one of a voltage, a frequency, or a quantity of the one or more phases of the electrical signal of the AC power source. In additional or alternative examples, the weave pattern can be determined based on one or more factors such as, for instance, (i) a type dust mitigation system 100 in which the dust mitigating fabric 112 will be implemented (e.g., a spacesuit, a tent, a blanket, flexible solar panel, flexible antenna etc.), (ii) a shape of the dust mitigating fabric 112 once implemented in the dust mitigation system 100, (iii) a desired flexibility for the fabric 112, (iv) characteristics of the electric-field that will be generated using the dust mitigating fabric 112 to repel dust, (v) a type of power source (e.g., a single phase power source and/or a multi-phase power source), (vi) a desired durability for the dust mitigating fabric 112, (vii) an expected environment in which the dust mitigating system 100 will be used (e.g., in outer space, on the lunar surface, and/or on a planetary surface (including, e.g., Earth-based applications), and/or a dust particle size to be repelled.

Further, in an additional or alternative example, determining the weave pattern can include determining the spacing of the warp strands 534 based on, for example, a voltage and/or frequency of the electrical signal conducted on the conductive warp strands 516. Additionally or alternatively, determining the weave pattern can include determining the parameters such that an intrinsic dielectric constant, the strand thickness, a strand density, and a net yarn dielectric constant do not negatively impact the formation of the electric-field and traveling wave formed on the front surface 128 of the dust mitigating fabric 112.

The process can include configuring, based on the determined weave pattern, the warp strand delivery unit 640 and the weft strand source 662. For example, configuring the warp strand delivery unit 640 can include mounting the bobbins 642 on the creel.

The process then includes feeding, based on the order and the spacing of the weave pattern, each warp strand 534 through a respective one of the heddles 650. For example, feeding each warp strand 534 through the respective heddle 650 can include feeding the warp strand 534 through the aperture 654 of the heddle 650. In an implementation in which each conductive warp strand 516 includes a conductive tow 216A on an insulative tow 216B (as shown in FIG. 2), feeding the warp strands 534 can include orienting each conductive warp strand 516 such that the conductive tow 216A is on the front surface 128 of the woven fabric 120 and each insulative tow 216B is on the back surface 130 of the woven fabric 120 opposing the front surface 128 of the woven fabric 120.

The process also includes coupling the heddles 650 to the harnesses 652 such that the groups 644 of warp strands 534 are movable, on a group by group basis, relative to each other. In one example, coupling the heddles 650 to the harnesses 652 includes coupling each group 656 of heddles 650 to a respective one of the harnesses 652. For instance, to configure the system 600 shown in FIG. 7, coupling the plurality of heddles 650 to the plurality of harnesses 652 can include coupling the first group 656A of heddles 650 to the first harness 652A, coupling the second group 656B of heddles 650 to the second harness 652B, coupling the third group 656C of heddles 650 to the third harness 652C, and coupling the fourth group 656D of heddles 650 to the fourth harness 652D. In an alternative example, as described above, one or more groups 656 of heddles 650 each can be distributed over multiple harnesses 652.

The process further includes feeding, from the plurality of heddles 650, the plurality of warp strands 534 through the reed 664 to the fabric beam 670. In an example, feeding the warp strands 534 through the reed 664 can include feeding the warp strands 534 through the dents 768 based on the determined order and spacing of the warp strands 534.

After feeding the warp strands 534 to the fabric beam 670, tension can be applied to the warp strands 534. For example, the fabric beam 670 and/or the warp strand delivery unit 640 can be actuated to apply tension to the warp strands 534. Maintaining the warp strands 534 under tension can beneficially facilitate precisely orienting and aligning the warp strands 534 relative to each other to form the woven fabric 120 according to the determined weave pattern.

After configuring the system 600 based on the determined weave pattern, the process can include weaving the weft strand 536 with the warp strands 534 to form the woven fabric 120 in accordance with the weave pattern. For example, the system 600 can form the woven fabric 120 by using the harnesses 652 to form the shed 758 a plurality of times and, each time the shed 758 is formed, inserting the weft strand 536 through the shed 758.

As described above, the system 600 can form the shed 758 by moving, using the harnesses 652, (i) the group 646 of insulative warp strands 518 and (ii) all of the one or more groups 648 of conductive warp strands 516 relative to each other. For instance, the harnesses 652 can form the shed 758 by raising the groups 648 of the conductive warp strands 516 to the elevated position while lowering the group of insulative warp strands 518 to the lowered position, and vice versa. Each time the shed 758 is formed, the picking device 660 inserts the weft strand 536 through the shed 758 to form a woven fabric 120.

After forming the woven fabric 120, the system 600 can form the adapter 124. For example, for each group 648 of conductive warp strands 516, the process can include (i) raising, using the plurality of harnesses 652, the group 648 of conductive warp strands 516 relative to the group 646 of insulative warp strands 518, (ii) while the group 648 of conductive warp strands 516 is raised, inserting the insulating termination sheet 676 between the group 648 of conductive warp strands 516 and the group 646 of insulative warp strands 518, (iii) after inserting the insulating termination sheet 676, lowering, using the plurality of harnesses 652, the group 648 of conductive warp strands 516 onto the insulating termination sheet 676, and (iv) after lowering the group 648 of conductive warp strands 516, coupling the conducting termination sheet 678 to the insulating termination sheet 676 such that the group 648 of conductive warp strands 516 is between the insulating termination sheet 676 and the conducting termination sheet 678.

FIGS. 8A-8J depict stages of the process for terminating the groups 648 of conductive warp strands 516 to form the adapter 124 according to one example. In this example, the groups 648 of conductive warp strands 516 include a first group 648A of conductive warp strands 516 corresponding to a first phase of the electrical signal, a second group 648B of conductive warp strands 516 corresponding to a second phase of the electrical signal, and a third group 648C of conductive warp strands corresponding to a third phase of the electrical signal to be provided by the power source 110.

For instance, in the example system 600 shown in FIG. 7, the first group 656A of heddles 650 coupled to the first harness 652A can receive the first group 648A of conductive warp strands 516, the second group 656B of heddles 650 coupled to the second harness 652B can receive the second group 648B of conductive warp strands 516, the third group 656C of heddles 650 coupled to the third harness 652C can receive the third group 648C of conductive warp strands 516, and the fourth group 656D of heddles 650 coupled to the fourth harness 652D can receive the group 646 of insulative warp strands 518. The harnesses 652A-652D and heddles 650 are omitted from FIGS. 8A-8J to more clearly illustrate the relative positions of the conductive warp strands 516 and the insulative warp strands 518 during the process for forming the adapter 124.

Figure 8B:
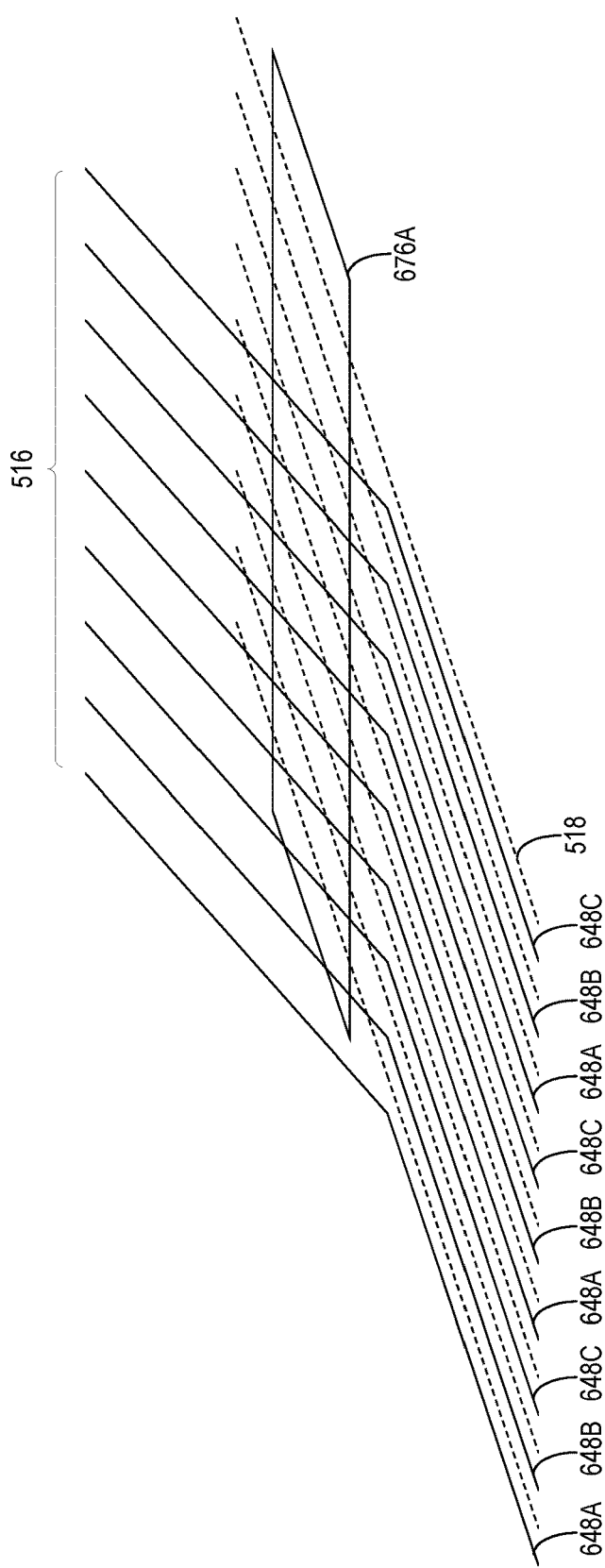

As shown in FIG. 8A, the process for forming the adapter 124 includes raising, using the harnesses 652A-652C, the groups 648A-648C of conductive warp strands 516 relative to the insulative warp strands 518, which the fourth harness 562 positions in the lowered position. In FIG. 8B, while the groups 648A-648C of conductive strands 516 are raised in the elevated position and the insulative strands 518 are in the lowered position, the process includes inserting a first insulating termination sheet 676A between the groups 648A-648C of conductive warp strands 516 and the insulative warp strands 518.

Figure 8C:
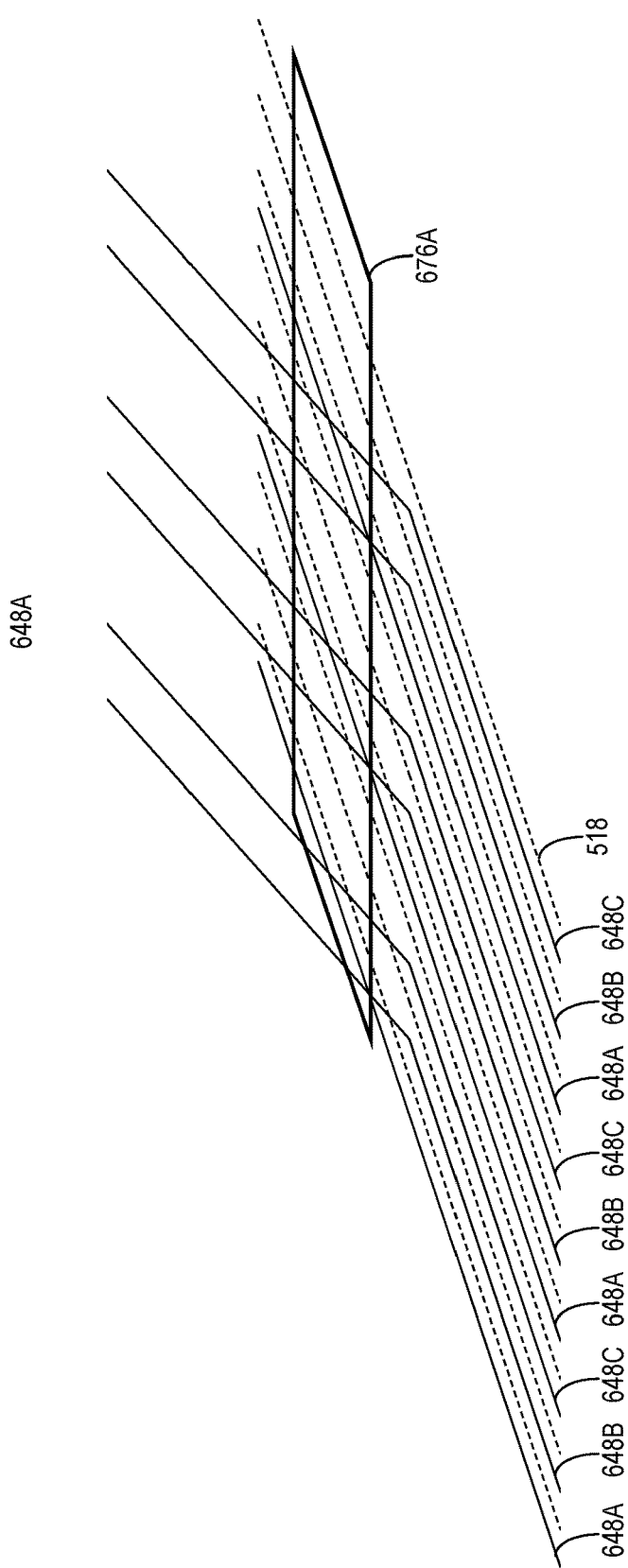
Figure 8D:
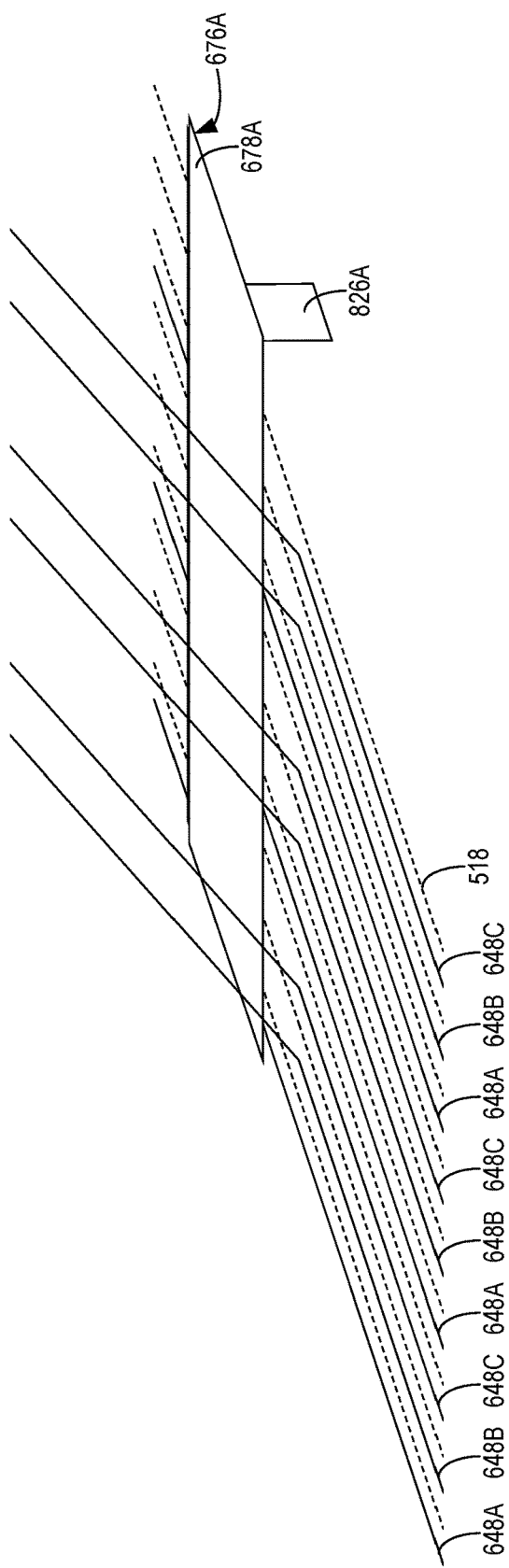

As shown in FIG. 8C, the first harness 652A lowers the first group 648A of conductive warp strands 516 onto the insulating termination sheet 676A. The second harness 652B and the third harness 652C maintain the second group 648B and the third group 648C of conductive warp strands 516 in the elevated position in FIG. 8C. As shown in FIG. 8D, the process then includes coupling a first conducting termination sheet 678A to the first insulating termination sheet 676A with the first group 648A of conductive warp strands 516 between the first conducting termination sheet 678A and the first insulating termination sheet 676A. The first conducting termination sheet 678A includes an integrated connection 826A for coupling the first group 648A of conductive warp strands 516 to the first phase of the electrical signal to be provided by power source 110.

Figure 8E:
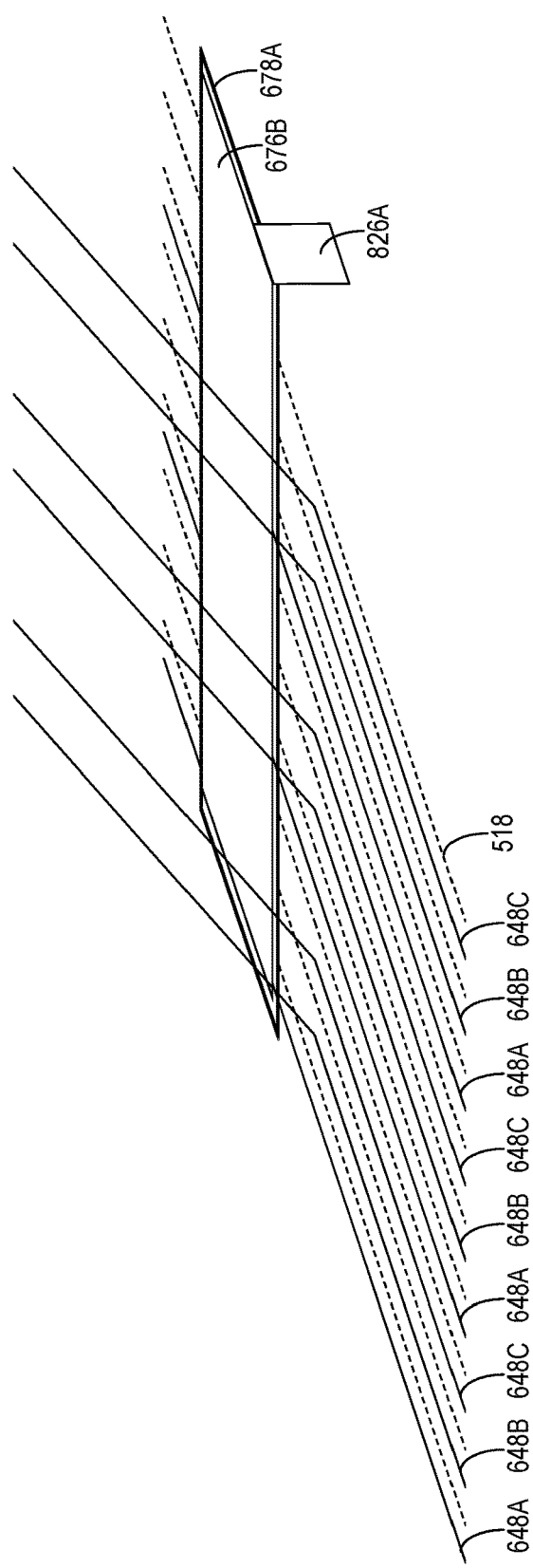
Figure 8F:
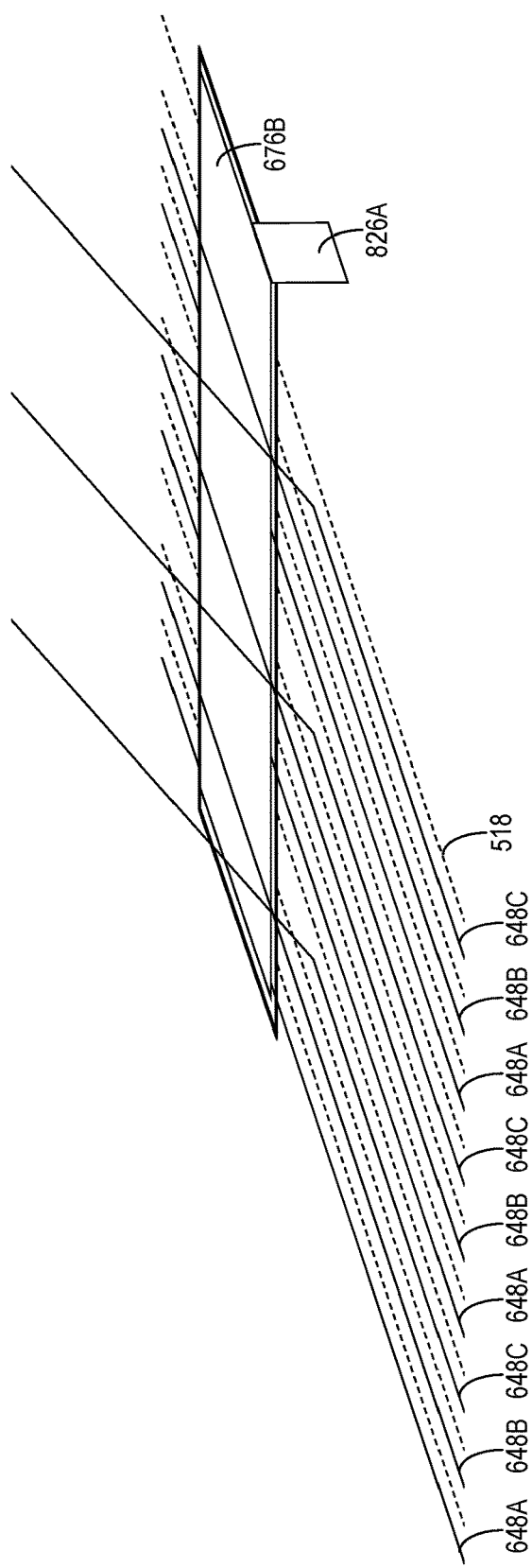
Figure 8G:
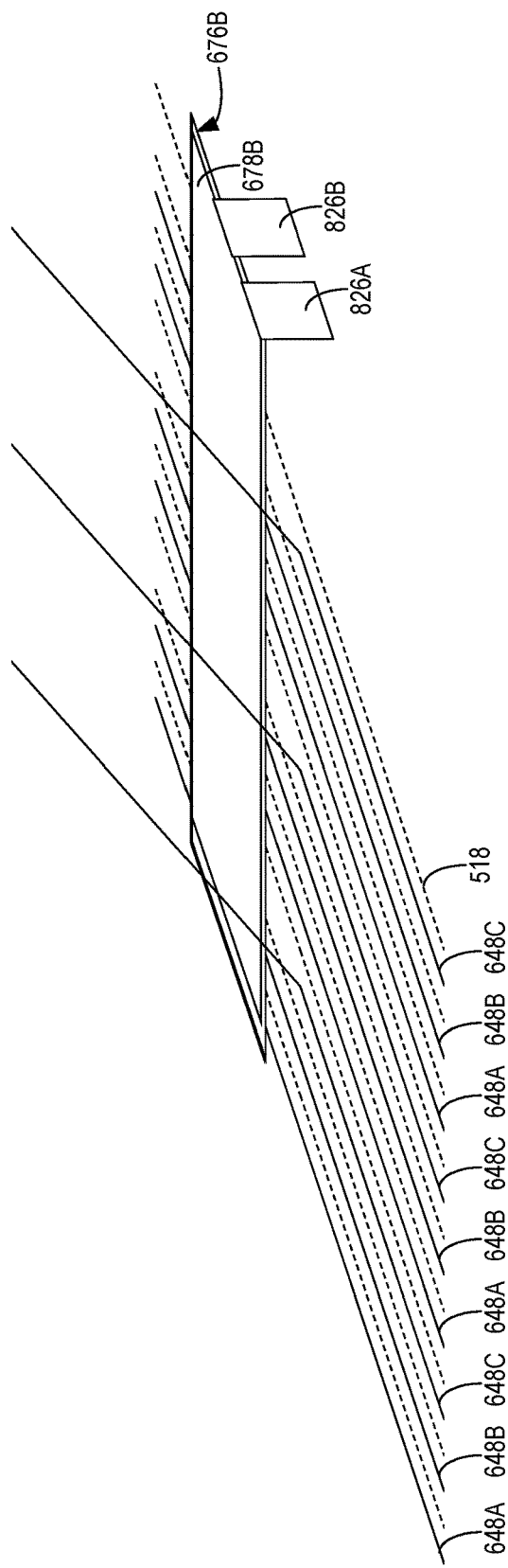

As shown in FIG. 8E, the process then includes inserting a second insulating termination sheet 676B on the first conducting termination sheets 678A. As shown in FIG. 8F, after inserting the second insulating termination sheet 676B, the second harness 652B lowers the second group 648B of conductive warp strands 516 on the second insulating termination sheet 676B. The third harness 652C maintains the third group 648C of conductive warp strands 516 in the elevated position in FIG. 8F. As shown in FIG. 8G, the process then includes coupling a second conducting termination sheet 678B to the second insulating termination sheet 676B with the second group 648B of conductive warp strands 516 between the second conducting termination sheet 678B and the second insulating termination sheet 676B. The second conducting termination sheet 678B includes an integrated connection 826B for coupling the second group 648B of conductive warp strands 516 to the second phase of the electrical signal to be provided by the power source 110.

Figure 8H:
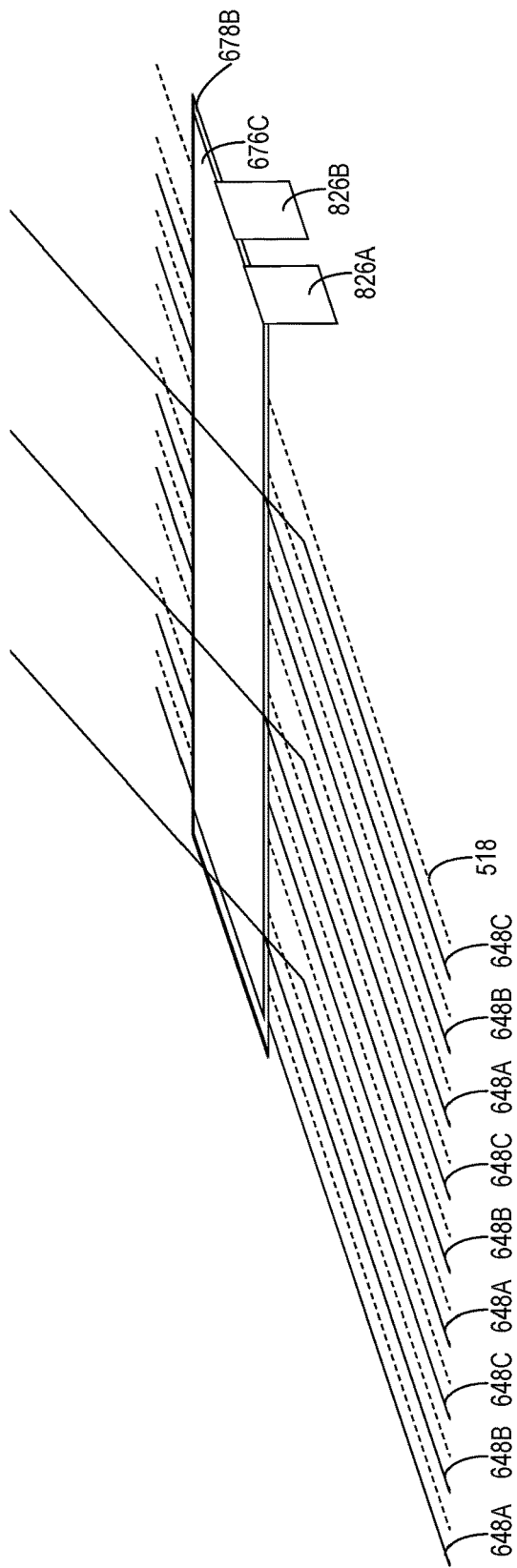
Figure 8I:
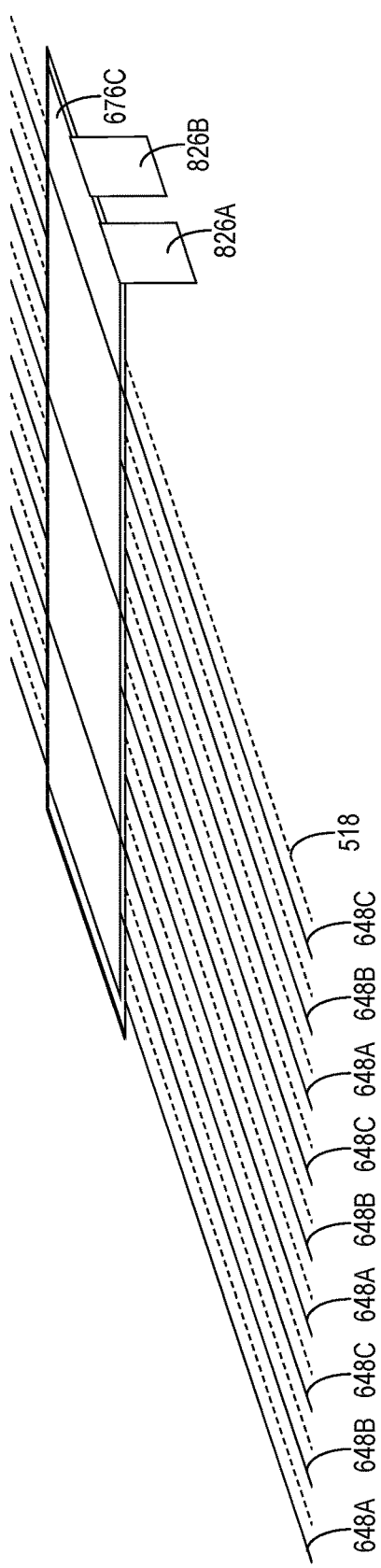
Figure 8J:
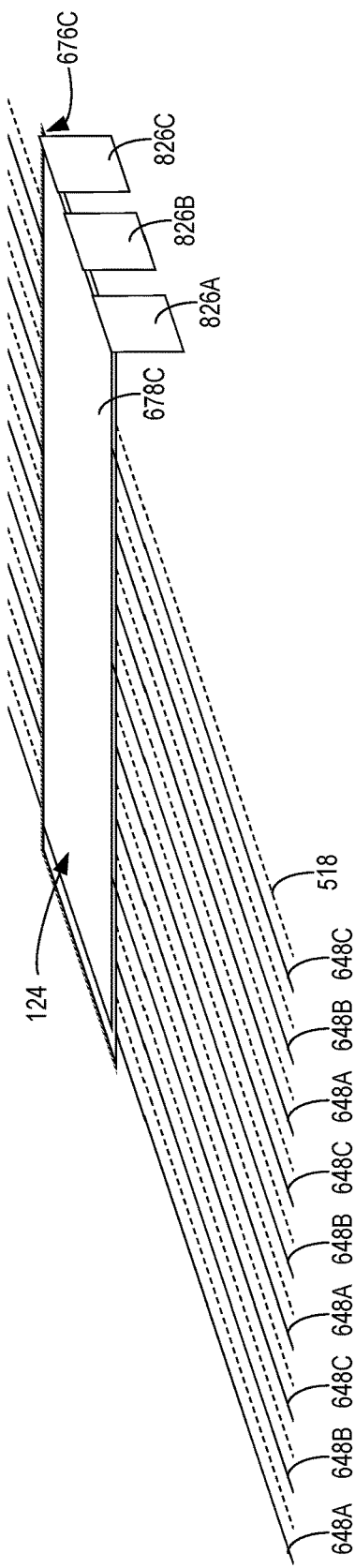

As shown in FIG. 8H, the process then includes inserting a third insulating termination sheet 676C on the second conducting termination sheets 678B. As shown in FIG. 8I, after inserting the third insulating termination sheet 676C, the third harness 652C lowers the third group 648C of conductive warp strands 516 on the third insulating termination sheet 676C. As shown in FIG. 8J, the process then includes coupling a third conducting termination sheet 678C to the third insulating termination sheet 676C with the third group 648C of conductive warp strands 516 between the third conducting termination sheet 678C and the third insulating termination sheet 676C. The third conducting termination sheet 678C includes an integrated connection 826C for coupling the third group 648C of conductive warp strands 516 to the third phase of the electrical signal to be provided by the power source 110.

FIG. 8J depicts the adapter 124 having connectors 826A, 826B, 826C for coupling each group 648A, 648B, 648C to the respective phase of the electrical signal. As the groups 648A, 648B, 648C of conductive warp strands 516 are separated from each other by respective insulating termination sheets 676B and 676C, short circuiting between the respective groups 648A, 648B, 648C of conductive warp strands 516 is mitigated (or eliminated).

Also as shown in FIGS. 8A-8J, the insulating termination sheets 676A-676C and the conducting termination sheets 678A-678C can extend across a width of the warp strands and, thus, the woven fabric 120. As described above, the conducting termination sheets 678A-678C are coupled to the insulating termination sheets 676A-676C. In one example, at least one of the respective conducting termination sheet 678A-678C or the insulating termination sheet 676A-676C can include a layer of adhesive to facilitate the coupling.

Also, as shown in FIGS. 8A-8J, the insulating termination sheets 676A-676C and the conducting termination sheets 678A-678C are all stacked on each other at the same position such that the edges of the sheets 676A-676C, 678A-678C are approximately aligned with each other. However, in alternative examples, the insulating termination sheets 676A-676C and/or the conducting termination sheets 678A-678C can be aligned differently relative to each other (e.g., offset by a distance relative to each other).

In one example, the robotic device 674 can insert the insulating termination sheets 676A-676C and couple the conducting termination sheets 678A-678C as described above. For instance, the robotic device 674 can use the end-effector to position each respective insulating termination sheet 676A-676C between the group 648A-648C of conductive warp strands 516 and the group of insulative warp strands 518, and couple the respective conducting termination sheet 678A-678C to the insulating termination sheet 676A-676C with the group 648A-648C of conductive warp strands 516 between the conducting termination sheet 678A-678C and the insulating termination sheet 676A-676C. In an alternative example, some or all of these operations can be performed manually without using the robotic device 674.

Figure 9:
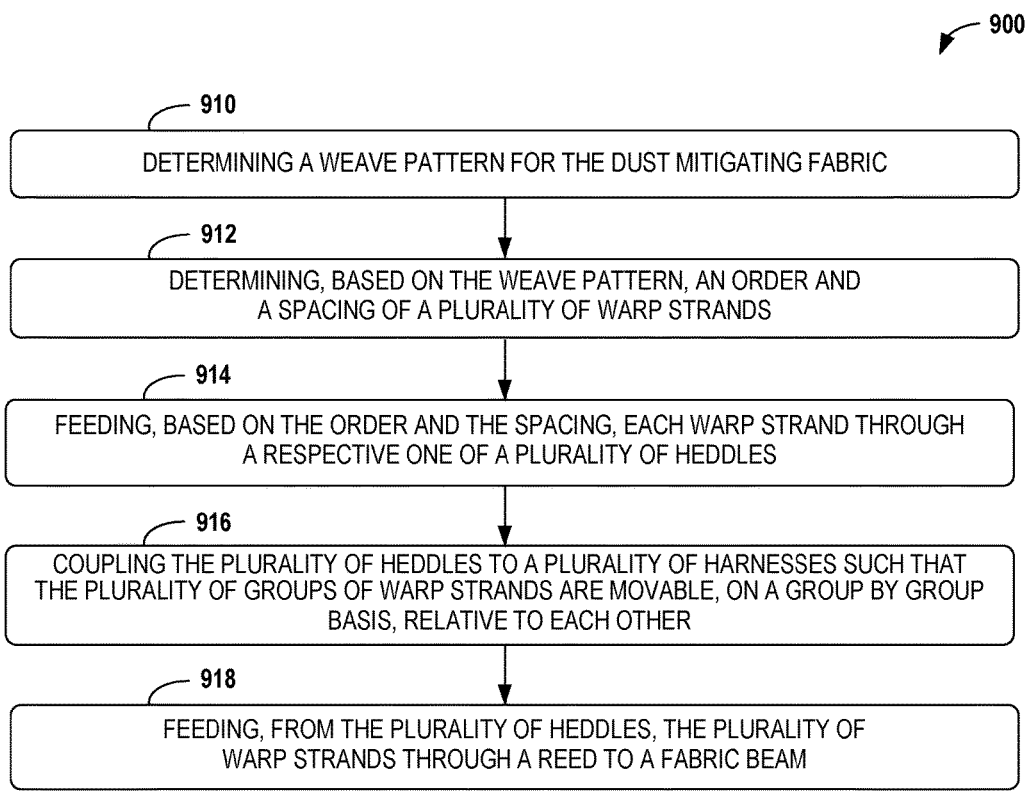
FIG. 9 illustrates a flow chart of an example process for forming a composite part, according to an example embodiment.

Referring now to FIG. 9, a flow chart for a process 900 for forming a dust mitigating fabric is depicted according to an example embodiment. The dust mitigating fabric includes an adapter for receiving an electrical signal, having one or more phases, from an AC power source. At block 910, the process 900 includes determining a weave pattern for the dust mitigating fabric. At block 912, the process 900 includes determining, based on the weave pattern, an order and a spacing of a plurality of warp strands. The plurality of warp strands include a plurality of groups of warp strands, which include a group of insulative warp strands and one or more groups of conductive warp strands. Each group of conductive warp strands corresponds to a respective phase of the electrical signal.

At block 914, the process 900 includes feeding, based on the order and the spacing, each warp strand through a respective one of a plurality of heddles. At block 916, the process 900 includes coupling the plurality of heddles to a plurality of harnesses such that the plurality of groups of warp strands are movable, on a group by group basis, relative to each other. At block 918, the process 900 includes feeding, from the plurality of heddles, the plurality of warp strands through a reed to a fabric beam.

Figure 10:
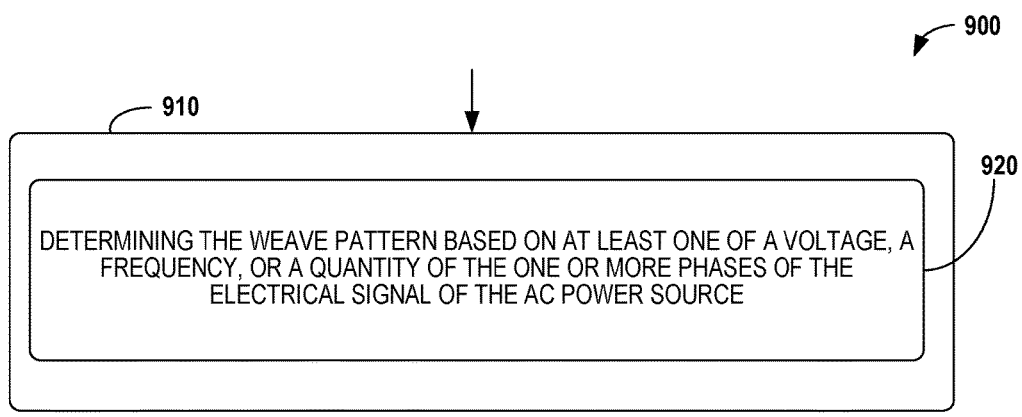
FIG. 10 illustrates a flow chart of an example process for forming a composite part, according to an example embodiment.

FIGS. 10-14 depict additional aspects of the process 900 according to further examples. As shown in FIG. 10, determining the weave pattern at block 910 can include determining the weave pattern based on at least one of a voltage, a frequency, or a quantity of the one or more phases of the electrical signal of the AC power source at block 920.

Figure 11:
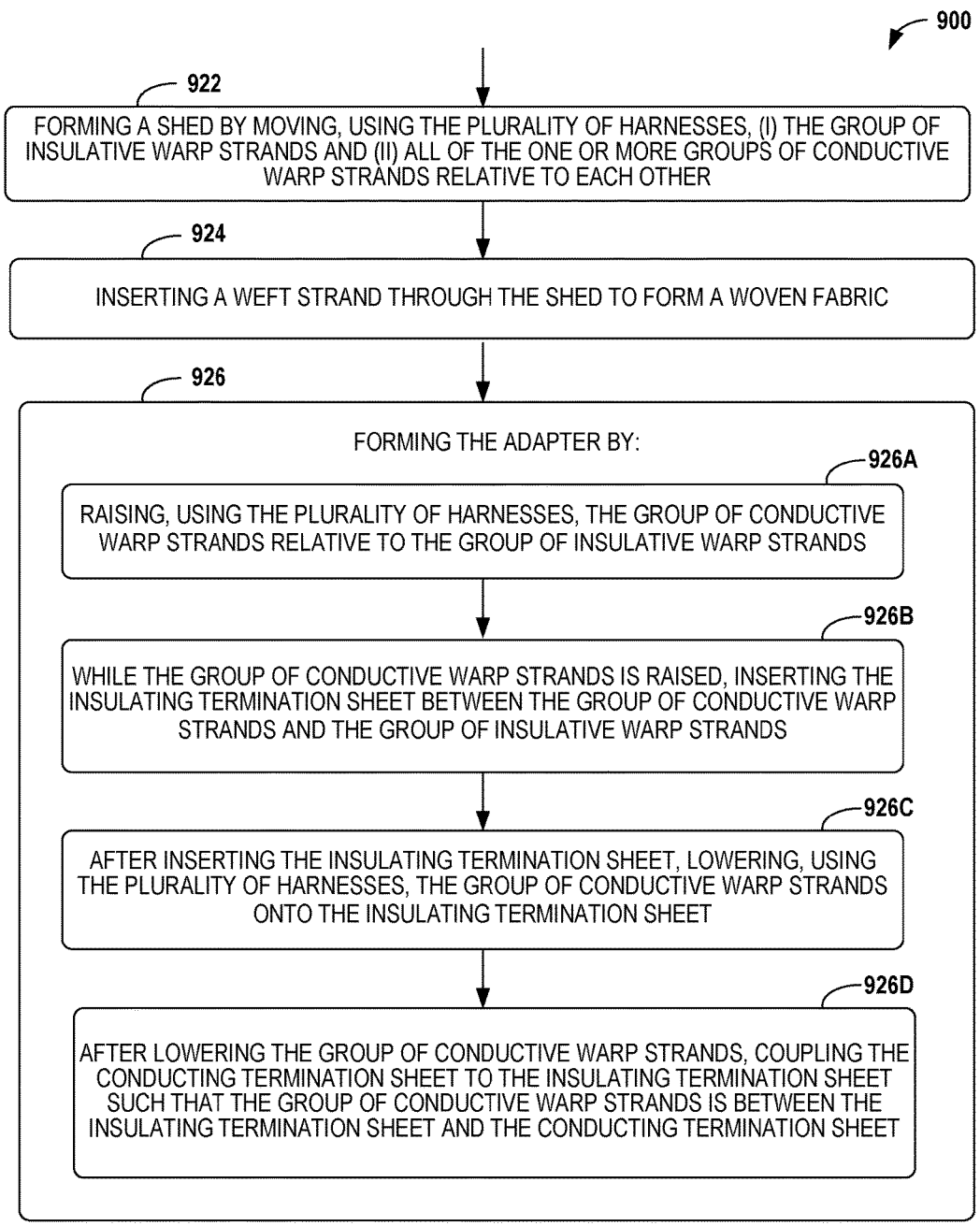
FIG. 11 illustrates a flow chart of an example process for forming a composite part, according to an example embodiment.

As shown in FIG. 11, the process 900 can include forming a shed by moving, using the plurality of harnesses, (i) the group of insulative warp strands and (ii) all of the one or more groups of conductive warp strands relative to each other at block 922. At block 924, the process 900 can include inserting a weft strand through the shed to form a woven fabric At block 926, the process 900 can include, after forming the woven fabric, forming the adapter. As shown in FIG. 11, forming the adapter can include, for each group of conductive warp strands: (i) raising, using the plurality of harnesses, the group of conductive warp strands relative to the group of insulative warp strands at block 926A, (ii) while the group of conductive warp strands is raised, inserting the insulating termination sheet between the group of conductive warp strands and the group of insulative warp strands at block 926B, (iii) after inserting the insulating termination sheet, lowering, using the plurality of harnesses, the group of conductive warp strands onto the insulating termination sheet at block 926C, and (iv) after lowering the group of conductive warp strands, coupling the conducting termination sheet to the insulating termination sheet such that the group of conductive warp strands is between the insulating termination sheet and the conducting termination sheet at block 926D.

Figure 12:
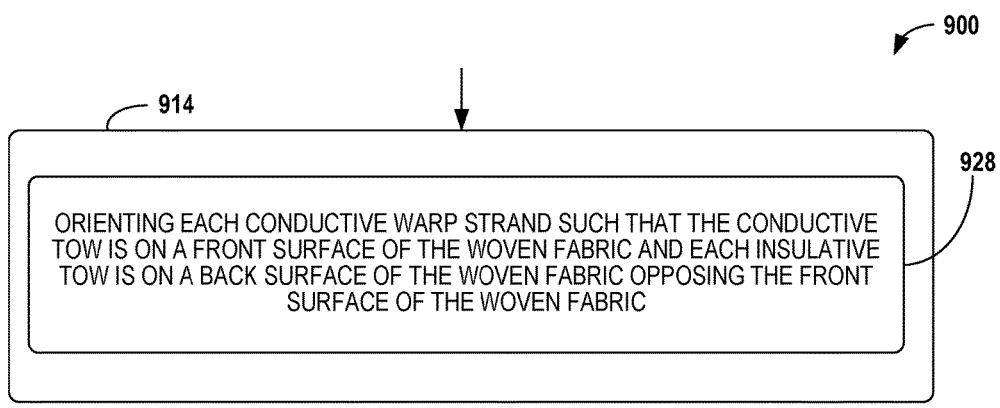
FIG. 12 illustrates a flow chart of an example process for forming a composite part, according to an example embodiment.

In FIG. 12, each conductive warp strand comprises a conductive tow on an insulative tow, and feeding each warp strand through the respective one of a plurality of heddles at block 914 can include orienting each conductive warp strand such that the conductive tow is on a front surface of the woven fabric and each insulative tow is on a back surface of the woven fabric opposing the front surface of the woven fabric at block 928.

Figure 13:
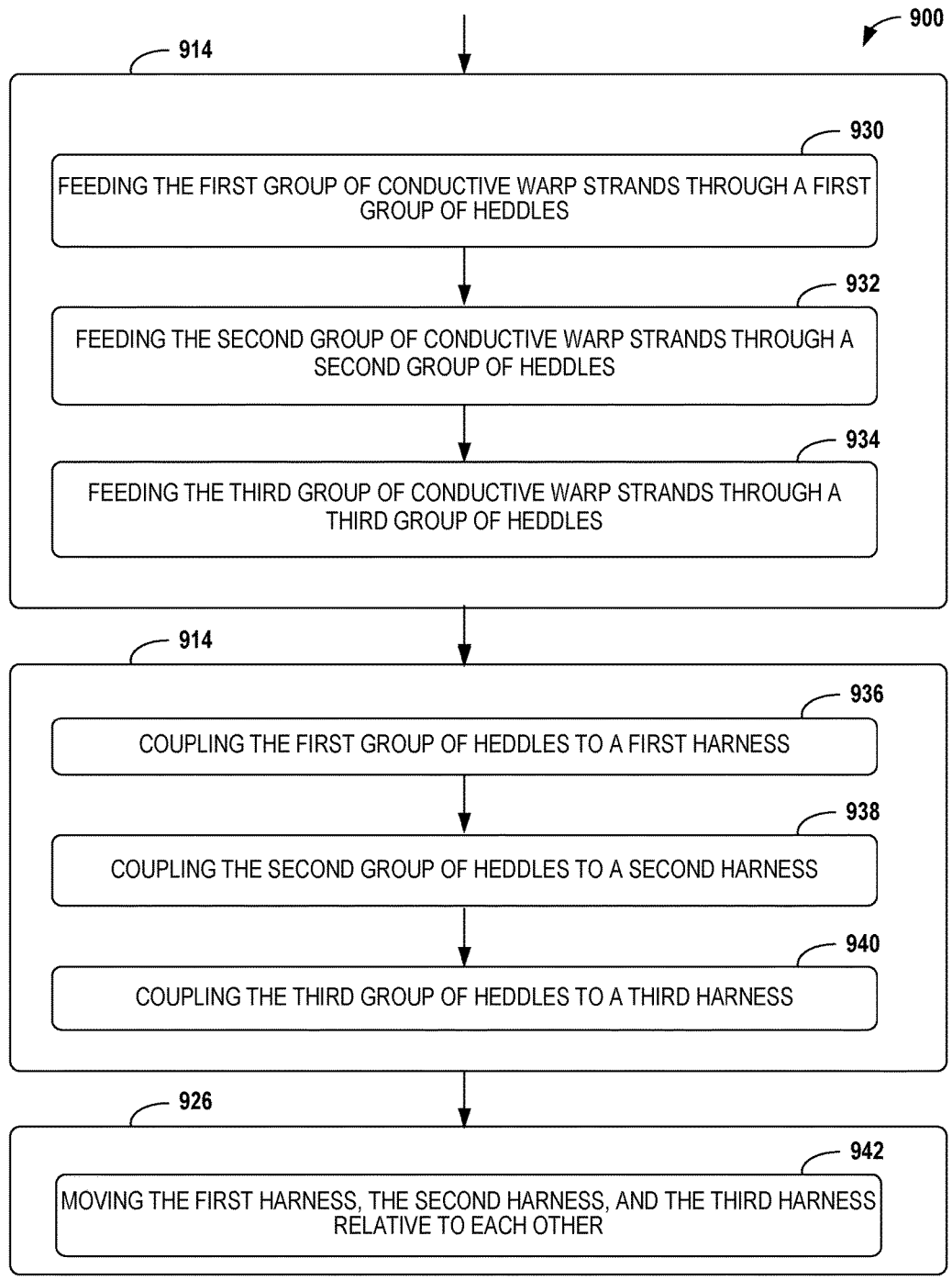
FIG. 13 illustrates a flow chart of an example process for forming a composite part, according to an example embodiment.

As shown in FIG. 13, feeding each warp strand through the respective one of the plurality of heddles at block 914 can include: (i) feeding the first group of conductive warp strands through a first group of heddles at block 930, (ii) feeding the second group of conductive warp strands through a second group of heddles at block 932, and (iii) feeding the third group of conductive warp strands through a third group of heddles at block 934. Also, in FIG. 13, coupling the plurality of heddles to the plurality of harnesses at block 916 can include: coupling the first group of heddles to a first harness at block 936, coupling the second group of heddles to a second harness at block 938, and coupling the third group of heddles to a third harness at block 940. As further shown in FIG. 13, forming the adapter at block 926 includes moving the first harness, the second harness, and the third harness relative to each other at block 942.

Figure 14:
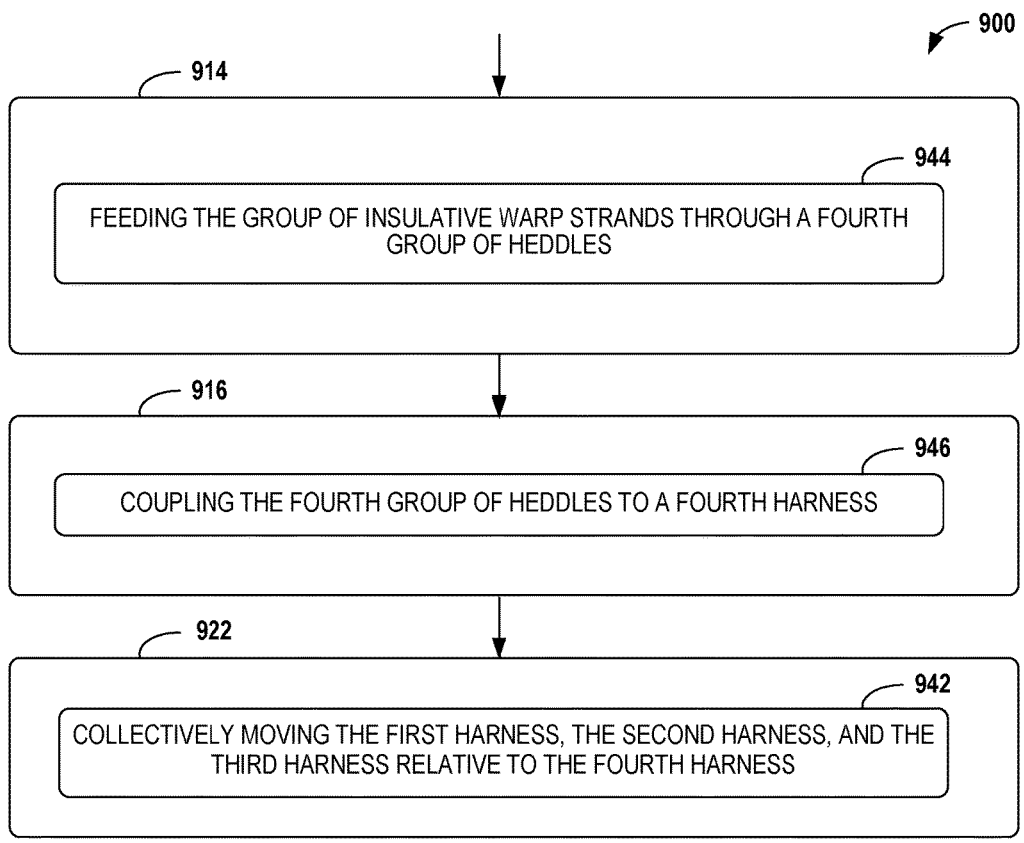
FIG. 14 illustrates a flow chart of an example process for forming a composite part, according to an example embodiment.

As shown in FIG. 14, feeding each warp strand through the respective one of the plurality of heddles at block 914 further includes feeding the group of insulative warp strands through a fourth group of heddles at block 944. As also shown in FIG. 14, coupling the plurality of heddles to the plurality of harnesses at block 916 can further include coupling the fourth group of heddles to a fourth harness at block 946, and forming the shed at block 922 can include collectively moving the first harness, the second harness, and the third harness relative to the fourth harness at block 948.

Figure 15:
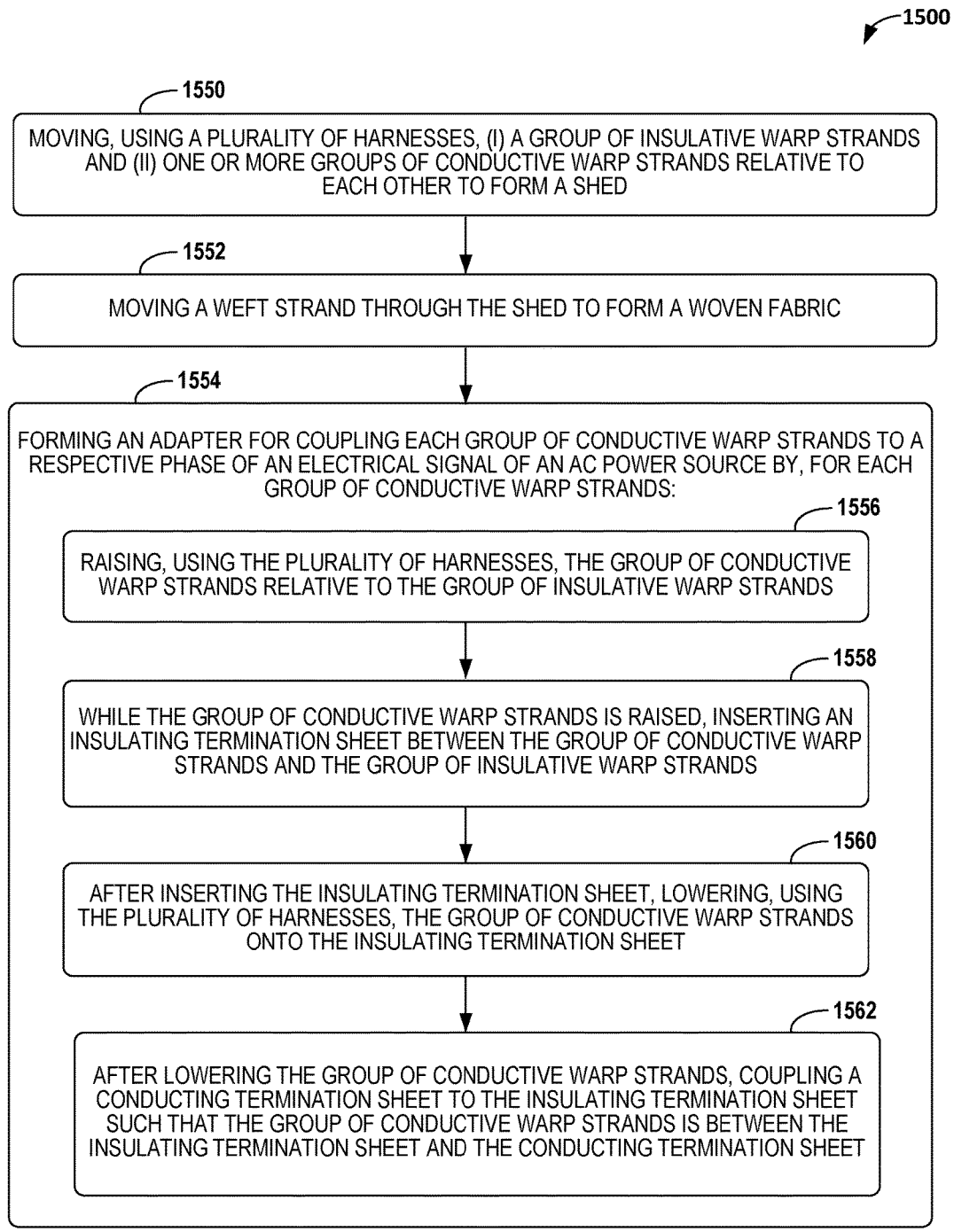
FIG. 15 illustrates a flow chart of an example process for forming a composite part, according to an example embodiment.

Referring now to FIG. 15, a flow chart for a process 1500 for forming a dust mitigating fabric is depicted according to another example embodiment. At block 1550, the process 1500 includes moving, using a plurality of harnesses, (i) a group of insulative warp strands and (ii) one or more groups of conductive warp strands relative to each other to form a shed. At block 1552, the process 1500 includes moving a weft strand through the shed to form a woven fabric. After forming the woven fabric at block 1552, the process 1500 includes forming an adapter for coupling each group of conductive warp strands to a respective phase of an electrical signal of an AC power source at block 1554.

As shown in FIG. 15, forming the adapter at block 1554 includes, for each group of conductive warp strands: (i) raising, using the plurality of harnesses, the group of conductive warp strands relative to the group of insulative warp strands at block 1556, (ii) while the group of conductive warp strands is raised, inserting an insulating termination sheet between the group of conductive warp strands and the group of insulative warp strands at block 1558, (iii) after inserting the insulating termination sheet at block 1558, lowering, using the plurality of harnesses, the group of conductive warp strands onto the insulating termination sheet at block 1560, and (iv) after lowering the group of conductive warp strands at block 1560, coupling a conducting termination sheet to the insulating termination sheet such that the group of conductive warp strands is between the insulating termination sheet and the conducting termination sheet at block 1562.

Figure 16:
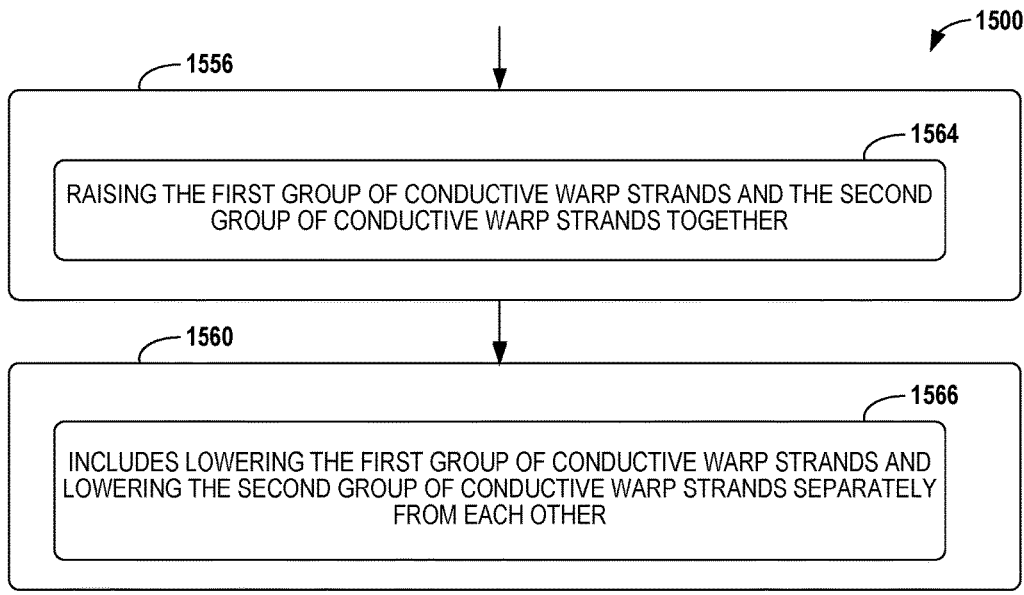
FIG. 16 illustrates a flow chart of an example process for forming a composite part, according to an example embodiment.
Figure 17:
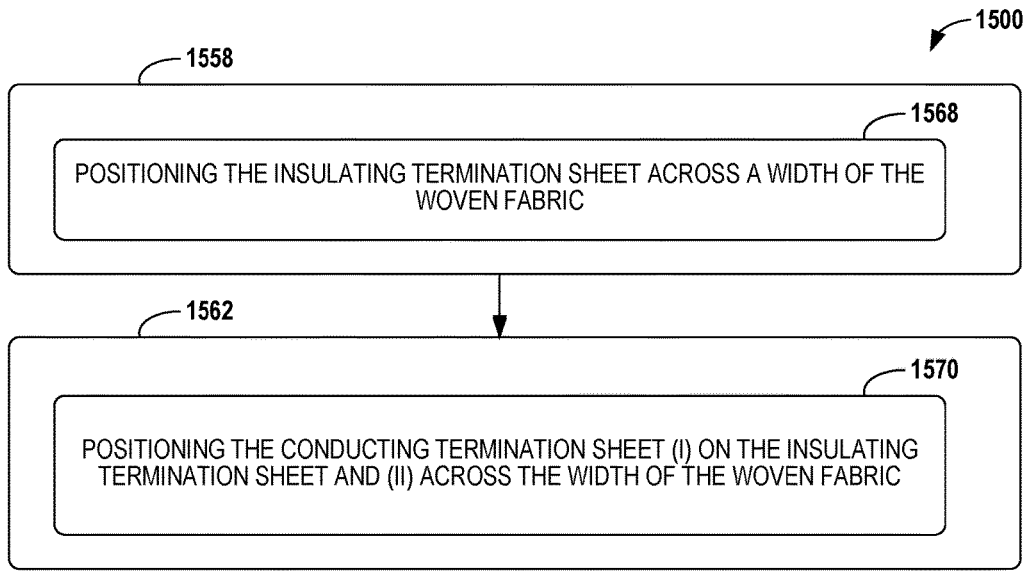
FIG. 17 illustrates a flow chart of an example process for forming a composite part, according to an example embodiment.

FIGS. 16-17 depict additional aspects of the process 1500 according to further examples. In one example, the one or more groups of conductive warp strands includes a first group of conductive warp strands and a second group of conductive warp strands. In FIG. 16, for instance, raising, using the plurality of harnesses, the group of conductive warp strands at block 1556 includes raising the first group of conductive warp strands and the second group of conductive warp strands together at block 1564. Also, in FIG. 16, lowering, using the plurality of harnesses, the group of conductive warp strands at block 1560 includes lowering the first group of conductive warp strands and lowering the second group of conductive warp strands separately from each other at block 1566.

As shown in FIG. 17, inserting the insulating termination sheet at block 1558 includes positioning the insulating termination sheet across a width of the woven fabric at block 1568. Also, in FIG. 17, coupling the conducting termination sheet at block 1562 includes positioning the conducting termination sheet (i) on the insulating termination sheet and (ii) across the width of the woven fabric at block 1570

It should be understood that for this and other processes and methods disclosed herein, flowcharts show functionality and operation of one possible implementation of present embodiments. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

In the examples described above, the adapter 124 is formed for coupling the conductive warp strands 516 to the power source 110. In additional or alternative examples including the conductive weft strand(s) 516' (e.g., as shown in FIGS. 5C-5D), the system and processes can further form an adapter for coupling the conductive weft strand 516' to a power source. In one implementation, the conductive weft strand(s) 516' can be arranged in one or more groups corresponding to respective phase(s) of the electrical signal. The system can include one or more actuators for moving, on a group by group basis, the groups of conductive weft strands 516' relative to each other to facilitate inserting insulating termination sheet(s) and coupling conducting termination sheet(s) as described above.

Figure 18:
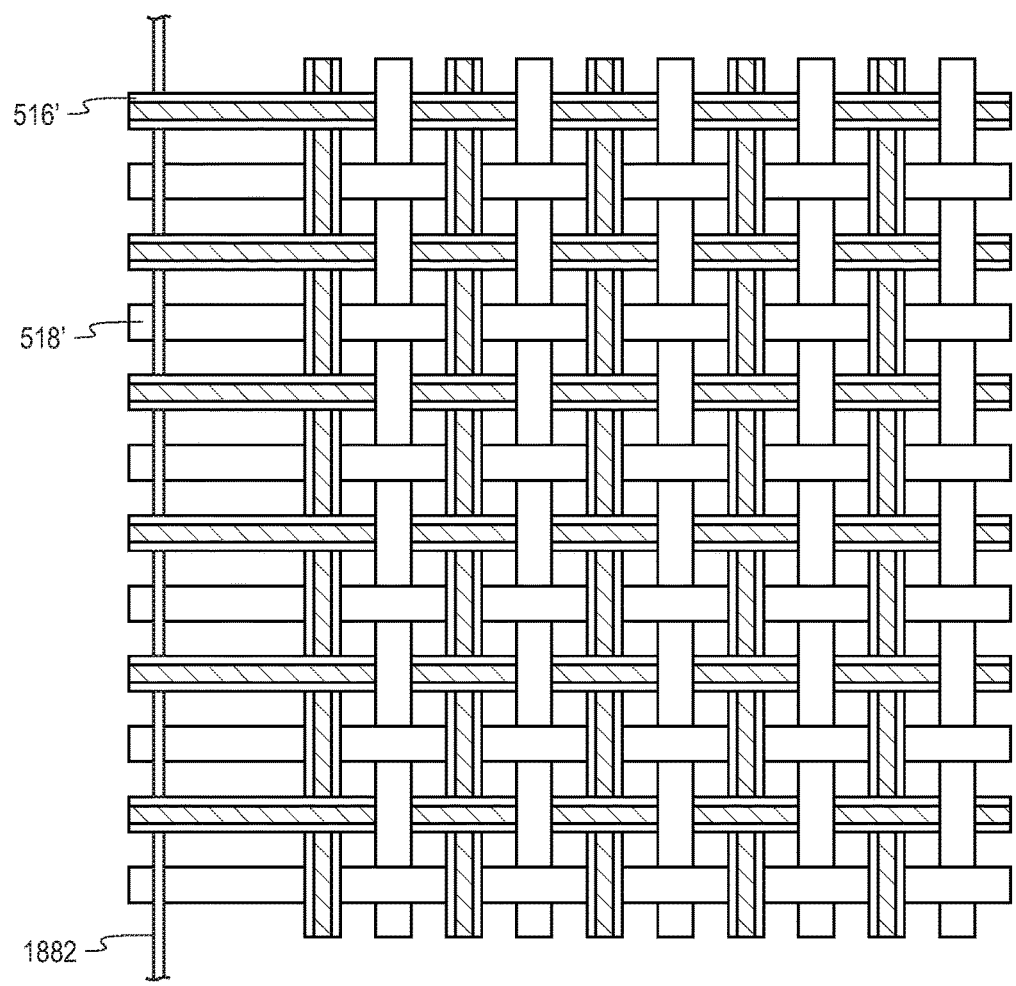
FIG. 18 illustrates an actuator for forming an adapter for coupling conductive weft strand(s) to a power source according to an example embodiment.

FIG. 18 depicts an actuator for moving a group of conductive weft strands 516' to form the adapter according to one example embodiment. As shown in FIG. 18, the actuator is in the form of a bar 1882 that can be moved between an elevated position and a lowered position. The conductive weft strands 516' can be positioned on the bar 1882 during the weaving process (e.g., each time the conductive weft strand 516' is inserted in the shed 758). To terminate the conductive weft strands 516', the bar 1882 can raise the conductive weft strands 516' to the elevated position to facilitate inserting an insulating termination sheet between the conductive weft strands 516' and, for instance, the insulative weft strands 518'. After inserting the insulating termination sheet, the bar 1882 can lower the conductive weft strand 516' on the insulating termination sheet. Then, a conducting termination sheet can be coupled to the insulating termination sheet with the conductive weft strands 516' between the insulating termination sheet and the conducting termination sheet.

Although the example shown in FIG. 18 includes a single bar 1882 to couple the conductive weft strands 516' to a single phase of an electrical signal, the system can include multiple bars 1882 to facilitate coupling the conductive weft strands 516' in multiple groups to a multi-phase electrical signal in an additional or alternative example. For instance, the system can move, using the bars 1882, the groups of conductive weft strands 516' on a group by group basis to facilitate coupling each group to a respective phase of the electrical signal in a manner similar to that described above. Additionally, for example, one or more bars can be used to facilitate coupling one or more groups of conductive warp strands 516 in addition or in alternative to the heddles and harnesses described above.

Although the systems and methods described above form a dust mitigating fabric using a weaving technique, aspects of these systems and processes can be extended to form a dust mitigating fabric using other techniques. For example, similar systems and processes can be used to form a dust mitigating fabric using a knitting technique, a sewing technique, and/or a bonding technique. In such examples, during the knitting, sewing and/or bonding processes, the conductive strands can be positioned on one or more bars in one or more respective groups. In a manner similar to that described above, an adapter can be formed by moving, using the bars, the groups of conductive strands on a group by group basis to facilitate inserting insulating termination sheets and coupling conducting termination sheets to form the adapter.

In an additional or alternative example, the conductive strands can be manually inserted in a pre-woven fabric formed from insulative strands. For instance, the conductive strands can be manually inserted, using a needle, into the warp strands and/or the weft strands of the pre-woven fabric. The manually inserted conductive strands can be positioned on one or more bars in one or more respective groups. And, in a manner similar to that described above, an adapter can be formed by moving, using the bars, the groups of conductive strands on a group by group basis to facilitate inserting insulating termination sheets and coupling conducting termination sheets to form the adapter.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure for various embodiments with various modifications as are suited to the particular use contemplated.

What is claimed is:

1. A method of forming a dust mitigating fabric, wherein the dust mitigating fabric includes an adapter for receiving an electrical signal, having a plurality of phases, from an alternating-current (AC) power source, the method comprising:
    determining a weave pattern for the dust mitigating fabric;
    determining, based on the weave pattern, an order and a spacing of a plurality of warp strands, wherein the plurality of warp strands comprise a plurality of groups of warp strands including a group of insulative warp strands and a plurality of groups of conductive warp strands, wherein each group of conductive warp strands corresponds to a respective phase of the electrical signal;
    feeding, based on the order and the spacing, each warp strand through a respective one of a plurality of heddles;
    coupling the plurality of heddles to a plurality of harnesses such that the plurality of groups of warp strands are movable, on a group by group basis, relative to each other;
    feeding, from the plurality of heddles, the plurality of warp strands through a reed to a fabric beam; and
    forming the adapter by, for each group of conductive warp strands, positioning a respective insulating termination sheet between the group of conductive warp strands and the group of insulative warp strands,
    wherein determining the weave pattern comprises determining the weave pattern such that the dust mitigating fabric comprises the plurality of groups of conductive warp strands being entirely insulated from each other.

2. The method of claim 1, wherein determining the weave pattern comprises determining the weave pattern based on at least one of a voltage, a frequency, or a quantity of the plurality of phases of the electrical signal of the AC power source.

3. The method of claim 1, further comprising:
    forming a shed by moving, using the plurality of harnesses, (i) the group of insulative warp strands and (ii) all of the one or more groups of conductive warp strands relative to each other;
    inserting a weft strand through the shed to form a woven fabric; and
    after forming the woven fabric, forming the adapter, wherein forming the adapter comprises, for each group of conductive warp strands:
        raising, using the plurality of harnesses, the group of conductive warp strands relative to the group of insulative warp strands,
        while the group of conductive warp strands is raised, inserting an insulating termination sheet between the group of conductive warp strands and the group of insulative warp strands,
        after inserting the insulating termination sheet, lowering, using the plurality of harnesses, the group of conductive warp strands onto the insulating termination sheet, and
        after lowering the group of conductive warp strands, coupling a conducting termination sheet to the insulating termination sheet such that the group of conductive warp strands is between the insulating termination sheet and the conducting termination sheet.

4. The method of claim 3, wherein each conductive warp strand comprises a conductive tow on an insulative tow, and wherein feeding each warp strand through the respective one of a plurality of heddles comprises orienting each conductive warp strand such that the conductive tow is on a front surface of the woven fabric and each insulative tow is on a back surface of the woven fabric opposing the front surface of the woven fabric.

5. The method of claim 3, wherein the one or more groups of conductive warp strands comprise a first group of conductive warp strands, a second group of conductive warp strands, and a third group of conductive warp strands,
    wherein feeding each warp strand through the respective one of the plurality of heddles comprises:
        feeding the first group of conductive warp strands through a first group of heddles,
        feeding the second group of conductive warp strands through a second group of heddles, and
        feeding the third group of conductive warp strands through a third group of heddles,
    wherein coupling the plurality of heddles to the plurality of harnesses comprises:
        coupling the first group of heddles to a first harness,
        coupling the second group of heddles to a second harness, and
        coupling the third group of heddles to a third harness, and
    wherein forming the adapter comprises moving the first harness, the second harness, and the third harness relative to each other.

6. The method of claim 5, wherein feeding each warp strand through the respective one of the plurality of heddles further comprises feeding the group of insulative warp strands through a fourth group of heddles,
    wherein coupling the plurality of heddles to the plurality of harnesses further comprises coupling the fourth group of heddles to a fourth harness, and
    wherein forming the shed comprises collectively moving the first harness, the second harness, and the third harness relative to the fourth harness.

7. The method of claim 1, wherein forming the adapter further comprises, for each group of conductive warp strands, coupling a respective conducting termination sheet to the respective insulating termination sheet with the group of conductive warp strands between the respective conducting termination sheet and the respective insulating termination sheet.

8. A method of forming a dust mitigating fabric, comprising:
   moving, using a plurality of harnesses, (i) a group of insulative warp strands and (ii) one or more groups of conductive warp strands relative to each other to form a shed;
   moving a weft strand through the shed to form a woven fabric; and
   after forming the woven fabric, forming an adapter for coupling each group of conductive warp strands to a respective phase of an electrical signal of an alternating-current (AC) power source,
   wherein forming the adapter comprises, for each group of conductive warp strands:
      raising, using the plurality of harnesses, the group of conductive warp strands relative to the group of insulative warp strands,
      while the group of conductive warp strands is raised, inserting an insulating termination sheet between the group of conductive warp strands and the group of insulative warp strands,
      after inserting the insulating termination sheet, lowering, using the plurality of harnesses, the group of conductive warp strands onto the insulating termination sheet, and
      after lowering the group of conductive warp strands, coupling a conducting termination sheet to the insulating termination sheet such that the group of conductive warp strands is between the insulating termination sheet and the conducting termination sheet.

9. The method of claim 8, wherein the one or more groups of conductive warp strands comprises a first group of conductive warp strands and a second group of conductive warp strands,
   wherein raising, using the plurality of harnesses, the group of conductive warp strands comprises raising the first group of conductive warp strands and the second group of conductive warp strands together, and
   wherein lowering, using the plurality of harnesses, the group of conductive warp strands comprises lowering the first group of conductive warp strands and lowering the second group of conductive warp strands separately from each other.

10. The method of claim 8, wherein inserting the insulating termination sheet comprises positioning the insulating termination sheet across a width of the woven fabric, and
    wherein coupling the conducting termination sheet comprises positioning the conducting termination sheet (i) on the insulating termination sheet and (ii) across the width of the woven fabric.

11. A system for forming a dust mitigating fabric, wherein the dust mitigating fabric includes an adapter for receiving an electrical signal, having one or more phases, from an alternating-current (AC) power source, the system comprising:
    a warp strand delivery unit including a plurality of warp strands, wherein the plurality of warp strands comprise a plurality of insulative warp strands and a plurality of conductive warp strands, wherein the plurality of warp strands comprise a plurality of groups of warp strands including a group of insulative warp strands and one or more groups of conductive warp strands, wherein each group of conductive warp strands corresponds to a respective phase of the electrical signal;
    a plurality of heddles that each receive a respective one of the plurality of warp strands;
    a plurality of harnesses coupled to the plurality of heddles, wherein the plurality of harnesses are operable to:
       move the plurality of groups of warp strands relative to each other to form a shed between the plurality of insulative warp strands and the plurality of conductive warp strands, and
       move, on a group by group basis, each group of conductive warp strands relative to the group of insulative warp strands to facilitate forming the adapter; and
    a picking device operable to move a weft strand through the shed to form a woven fabric,
    wherein the one or more groups of conductive warp strands comprises a first group of conductive warp strands corresponding to a first phase of the electrical signal, and a second group of conductive warp strands corresponding to a second phase of the electrical signal, and
    wherein to form the adapter, the plurality of harnesses are operable to:
       raise the plurality of conductive warp strands to an elevated position relative to the plurality of insulative warp strands to facilitate inserting a first insulating termination sheet between the plurality of conductive warp strands and the plurality of insulative warp strands,
       after the first insulating termination sheet is inserted, lower the first group of conductive warp strands to facilitate coupling a first conducting termination sheet to the first insulating termination sheet with the first group of conductive warp strands between the first conducting termination sheet and the first insulating termination sheet,
       after the first group of conductive warp strands is lowered, maintain the second group of conductive warp strands in the elevated position to facilitate inserting a second insulating termination sheet between the plurality of insulative warp strands and the second group of conductive warp strands, and
       after the second insulating termination sheet is inserted, lower the second group of conductive warp strands to facilitate coupling a second conducting termination sheet to the second insulating termination sheet with the second group of conductive warp strands between the second conducting termination sheet and the second insulating termination sheet.

12. The system of claim 11, wherein the one or more groups of conductive warp strands is a single group of conductive warp strands and the one or more phases of the electrical signal is a single phase.

13. The system of claim 11, wherein the one or more groups of conductive warp strands further comprises a third group of conductive warp strands corresponding to a third phase of the electrical signal, and
    wherein to form the adapter, the plurality of harnesses are operable to:
       after the second group of conductive warp strands is lowered, maintain the third group of conductive warp strands in the elevated position to facilitate inserting a third insulating termination sheet between the plurality of insulative warp strands and the third group of conductive warp strands, and after the third insulating termination sheet is inserted, lower the third group of conductive warp strands to facilitate coupling a third conducting termination sheet to the third insulating termination sheet with the third group of conductive warp strands between the third conducting termination sheet and the third insulating termination sheet.

14. The system of claim 11, further comprising a robotic device having an end-effector that is operable, for each group of conductive warp strands, to:

position a respective insulating termination sheet between the group of conductive warp strands and the group of insulative warp strands; and couple a respective conducting termination sheet to the respective insulating termination sheet with the group of conductive warp strands between the respective conducting termination sheet and the respective insulating termination sheet, wherein, for the first group of conductive warp strands, the respective insulating termination sheet is the first insulating termination sheet and the respective conducting termination sheet is the first conducting termination sheet, and wherein, for the second group of conductive warp strands, the respective insulating termination sheet is the second insulating termination sheet and the respective conducting termination sheet is the second conducting termination sheet.

15. The system of claim 14, wherein the respective insulating termination sheet is coupled to the respective conducting termination sheet by an adhesive on at least one of the respective insulating termination sheet or the respective conducting termination sheet.

16. The system of claim 11, wherein each conductive warp strand comprises a conductive tow on an insulative tow, and wherein the plurality of heddles orient the plurality of conductive warp strands such that each conductive tow is on a front surface of the woven fabric and each insulative tow is on a back surface of the woven fabric opposing the front surface of the woven fabric.

17. The system of claim 16, wherein the weft strand is conductive, and wherein, for each conductive warp strand in the woven fabric, the weft strand is separated from the conductive tow by the insulative tow.

18. The system of claim 11, further comprising:

a fabric beam for receiving the woven fabric formed from the plurality of warp strands and the weft strand; and a reed operable to compact the weft strand against the woven fabric, wherein the reed includes a plurality of dents receiving the plurality of warp strands extending from the plurality of heddles to the fabric beam.

19. The system of claim 11, wherein the picking device is at least one of the group consisting of: a shuttle, a rapier, an air-jet, and a projectile.

* * * * *